United States Patent
Lee et al.

(10) Patent No.: US 9,191,860 B2
(45) Date of Patent: Nov. 17, 2015

(54) APPARATUS AND METHOD FOR ESTIMATING SIZE OF MAP MESSAGE IN BROADBAND WIRELESS COMMUNICATION

(75) Inventors: Hee-Kwang Lee, Anyang-si (KR);
Seung-Joo Maeng, Seongnam-si (KR);
Jae-Ho Jeon, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1559 days.

(21) Appl. No.: 12/378,868

(22) Filed: Feb. 20, 2009

(65) Prior Publication Data

US 2009/0213803 A1 Aug. 27, 2009

(30) Foreign Application Priority Data

Feb. 26, 2008 (KR) ........................ 10-2008-0017338

(51) Int. Cl.
*H04W 4/00* (2009.01)
*H04W 28/16* (2009.01)
*H04W 4/12* (2009.01)
*H04W 24/00* (2009.01)
*H04W 28/06* (2009.01)

(52) U.S. Cl.
CPC ................ *H04W 28/16* (2013.01); *H04W 4/12* (2013.01); *H04W 24/00* (2013.01); *H04W 28/06* (2013.01)

(58) Field of Classification Search
CPC .................................................... H04W 28/04
USPC .................................. 370/329, 328, 326, 327
See application file for complete search history.

(56) References Cited

U.S. PATENT DOCUMENTS

| | | | |
|---|---|---|---|
| 2004/0213157 A1* | 10/2004 | Karlsson et al. | 370/235 |
| 2007/0025386 A1* | 2/2007 | Riedel et al. | 370/445 |
| 2007/0086474 A1 | 4/2007 | Lee et al. | |
| 2007/0155334 A1* | 7/2007 | Chang et al. | 455/67.13 |
| 2007/0274253 A1* | 11/2007 | Zhang et al. | 370/328 |
| 2008/0034107 A1* | 2/2008 | Lee et al. | 709/232 |
| 2008/0112365 A1* | 5/2008 | Kwun et al. | 370/332 |
| 2008/0137601 A1* | 6/2008 | Sung et al. | 370/329 |
| 2008/0205365 A1* | 8/2008 | Russell et al. | 370/341 |
| 2009/0092085 A1* | 4/2009 | Ramesh et al. | 370/329 |
| 2010/0202401 A1* | 8/2010 | Hwang et al. | 370/330 |
| 2014/0161099 A1* | 6/2014 | Inohiza | 370/330 |

FOREIGN PATENT DOCUMENTS

| | | |
|---|---|---|
| KR | 1020060091158 A | 8/2006 |
| KR | 1020070040995 A | 4/2007 |
| KR | 1020070109069 A | 11/2007 |
| KR | 1020090092056 A | 8/2009 |

* cited by examiner

*Primary Examiner* — Hassan Kizou
*Assistant Examiner* — Abdelnabi Musa

(57) ABSTRACT

A resource allocation method of a Base Station (BS) in a wireless communication system is provided. The method includes estimating a size of a MAP message, and evaluating a size of an available burst allocation region according to the estimated size of the MAP message and allocating bursts in the evaluated-sized burst allocation region. Accordingly, when a DownLink (DL) subframe is used by being divining into a plurality of regions according to a burst characteristic, a throughput can be improved without waste of resources by estimating a resource amount occupied by a MAP message in the DL subframe.

22 Claims, 8 Drawing Sheets

APPARATUS AND METHOD FOR ESTIMATING SIZE OF MAP MESSAGE IN BROADBAND WIRELESS COMMUNICATION

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Feb. 26, 2008 and assigned Serial No. 10-2008-0017338, the entire disclosure of which is hereby incorporated by reference.

TECHNICAL FIELD OF THE INVENTION

The present invention relates to a broadband wireless communication system. More particularly, the present invention relates to an apparatus and method for estimating an overhead caused by a MAP message in a broadband wireless communication system.

BACKGROUND OF THE INVENTION

In the next generation communication system, also known as the $4^{th}$ Generation (4G) communication system, research is actively in progress to provide a Quality of Service (QoS) with a data transfer rate of about 100 Mbps. In particular, the 4G communication system currently is being developed to ensure mobility and QoS in a Broadband Wireless Access (BWA) communication system, such as a Wireless Local Area Network (WLAN) system and a Wireless Metropolitan Area Network (WMAN) system. A representative example of such a communication system is an Institute of Electrical and Electronics Engineers (IEEE) 802.16 system. The IEEE 802.16 system employs an Orthogonal Frequency Division Multiplexing (OFDM)/Orthogonal Frequency Division Multiple Access (OFDMA) scheme so that a broadband network can be supported in a physical channel.

In the broadband wireless communication system such as the IEEE 802.16 system, data is transmitted in a frame unit, and one frame is divided into a DownLink (DL) subframe for transmitting data from a Base Station (BS) to a Mobile Station (MS) and an UpLink (UL) subframe for transmitting data from the MS to the BS. The DL subframe and the uplink subframe are divided along a frequency axis and a time axis. A slot is a unit of a two-dimensional array divided along the frequency axis and the time axis. A subcarrier is one of resources shared in the broadband wireless communication system such as the IEEE 802.16 system. The subcarrier is channelized, and a concatenation of at least one subcarrier is used as a unit called a subchannel. A burst is a physical concatenation of data transmitted and received through a plurality of slots.

The BS allocates radio resources indicated in a unit of the subchannel, slot, symbol, etc., to the MSs. Each MS receives data by demodulating and decoding a burst received through a radio resource allocated by the BS to each MS. Thus, the BS transmits a MAP message for reporting resource allocation information to the MS. In general, the MAP message includes resource allocation information for one frame, and occupies a fixed amount of resources in each frame. That is, the MAP message is fixed in size. When the MAP message is fixed, it implies that the number of pieces of resource allocation information that can be included in the MAP message is fixed. In other words, since the number of resource allocation Information Elements (IEs) is fixed in one frame, there is a problem in that resource utility and resource efficiency are decreased.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and method for avoiding deterioration in resource usage efficiency due to a fixed size of a MAP message in a broadband wireless communication system.

Another aspect of the present invention is to provide an apparatus and method for estimating a size of a MAP message when the size of the MAP message changes in a broadband wireless communication system.

In accordance with an aspect of the present invention, a resource allocation method of a Base Station (BS) in a broadband wireless communication system is provided. The method includes estimating a size of a MAP message, evaluating a size of an available burst allocation region according to the estimated size of the MAP message and allocating bursts in the evaluated-sized burst allocation region.

In accordance with another aspect of the present invention, a BS apparatus in a broadband wireless communication system is provided. The apparatus includes an estimator for estimating a size of a MAP message, and an allocator for evaluating a size of an available burst allocation region according to the estimated size of the MAP message and for allocating bursts in the evaluated-sized burst allocation region.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1A through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, a resource allocation technique considering all cases of the co-existence of a non-MIMO burst and a MIMO burst, the use of power boosting, and the use of power deboosting in a broadband wireless communication system will be described. Although a wireless communication system employing an OFDM/OFDMA scheme will be described below as an example, the present invention can also equally apply to other types of wireless communication systems.

Figure 1A:
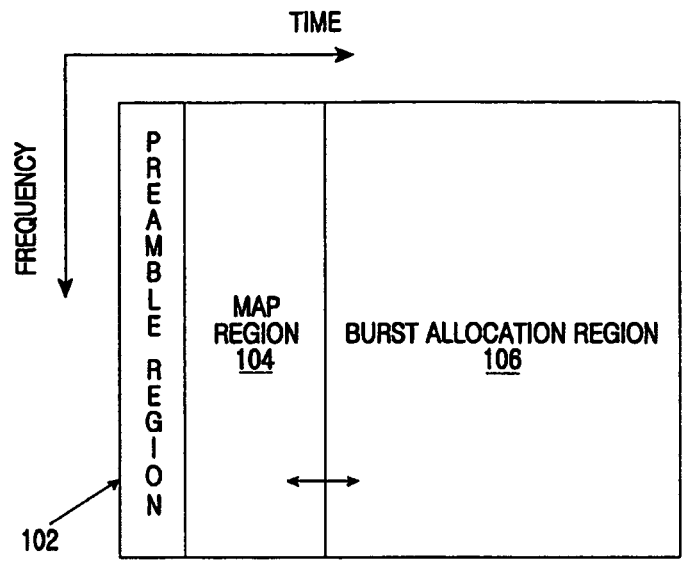
FIGS. 1A and 1B illustrate examples of a DownLink (DL) frame structure in a broadband wireless communication system according to an exemplary embodiment of the present invention.
Figure 1B:
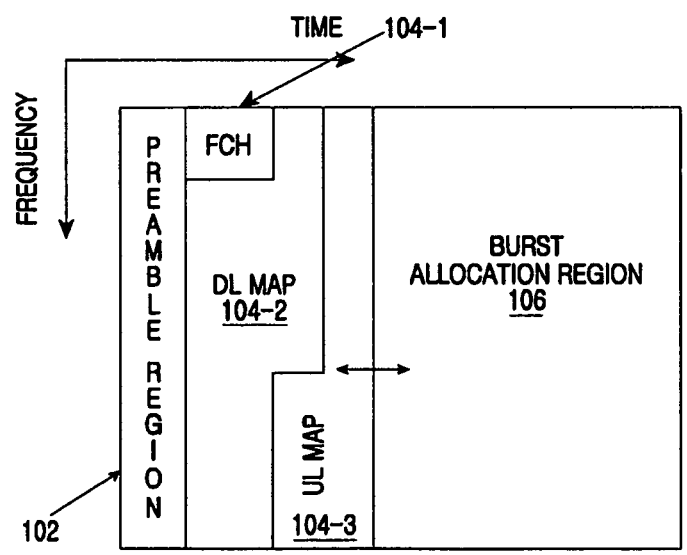

FIGS. 1A and 1B illustrate examples of a downlink subframe structure in a broadband wireless communication system according to an exemplary embodiment of the present invention.

Referring to FIG. 1A, the DL subframe includes a preamble region 102, a MAP region 104, and a burst allocation region 106 in a time axis. The preamble region 102 is a region for transmitting a preamble signal to acquire frame synchronization. The MAP region 104 is a region for transmitting a DL MAP or a UL MAP which must be received by all Mobile Stations (MSs). That is, the DL MAP includes burst allocation information of the DL subframe, and the UL MAP includes burst allocation information of a UL frame. The burst allocation region 106 is a region for transmitting DL data bursts to the MSs. Allocation information of the bursts included in the burst allocation region 106 is included in the DL MAP. In the burst allocation region 106, a horizontal axis is the time axis which is divided into OFDM symbols, and a vertical axis is a frequency axis which is divided into subchannels.

Referring to FIG. 1B, the MAP region 104 consists of a Frame Control Header (FCH) 104-1, a DL MAP 104-2, and a UL MAP 104-3. The FCH 104-1 includes coding information regarding the DL MAP 104-2 and the UL MAP 104-3. The coding information has to be preferentially confirmed before coding the DL MAP 104-2 and the UL MAP 104-3. The DL MAP 104-2 indicates burst allocation information in the DL subframe. The UL MAP 104-3 indicates burst allocation information in a UL subframe.

Figure 2A:
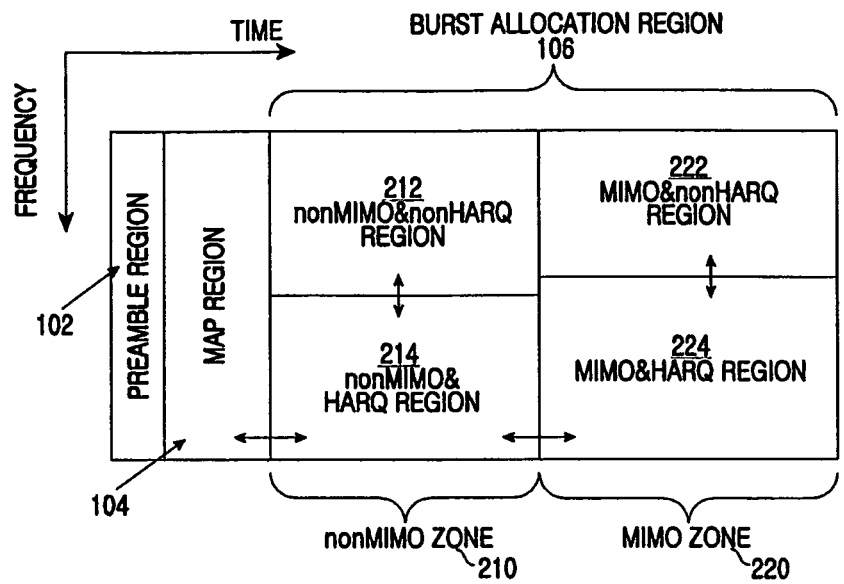
FIGS. 2A and 2B illustrate examples of using a burst allocation region of a DL frame in a broadband wireless communication system according to an exemplary embodiment of the present invention.
Figure 2B:
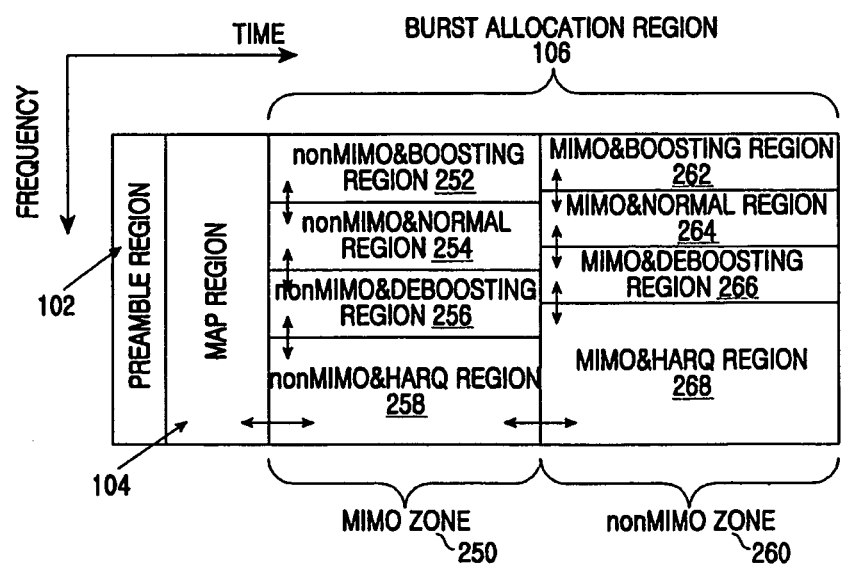

FIGS. 2A and 2B illustrate examples of using the burst allocation region 106 of the DL subframe of FIGS. 1A and 1B.

Referring to FIG. 2A, the burst allocation region 106 is divided along the time axis into a non-MIMO ("nonMIMO") zone 210 and a MIMO zone 220. The nonMIMO zone 210 is a region for transmitting bursts conforming to a Single Input Single Output (SISO) scheme or a Single Input Multiple Output (SIMO) scheme. The MIMO zone 220 is a region for transmitting bursts conforming to a MIMO scheme. The non-MIMO zone 210 is divided along the frequency axis into two regions, i.e., a nonMIMO&nonHybrid Automatic Repeat reQuest (nonHARQ) region 212 and a nonMIMO&HARQ region 214. The MIMO zone 220 is divided along the frequency axis into two regions, i.e., a MIMO&nonHARQ region 222 and a MIMO&HARQ region 224.

Time-axis sizes (i.e., symbol-axis sizes) of the MAP region 104 and the burst allocation region 106 are variable in an arrow direction shown in FIG. 2A. Likewise, time-axis sizes of the nonMIMO zone 210 and the MIMO zone 220 in the burst allocation region 106 are also variable. In addition, frequency-axis sizes (i.e., subchannel-axis sizes) of the nonMIMO&nonHARQ region 212, the nonMIMO&HARQ region 214, the MIMO&nonHARQ region 222, and the MIMO&HARQ region 224 are variable.

In the MIMO zone 220 shown in FIG. 2A, a MIMO&nonHARQ burst allocated to the MIMO&nonHARQ region 222 is the same as a MIMO&HARQ burst allocated to the MIMO&HARQ region 224 except that retransmission does not conform to an HARQ scheme. Therefore, in FIG. 2A, the MIMO&nonHARQ region 222 and the MIMO&HARQ region 224 can be concatenated into a single region.

Referring to FIG. 2B, the burst allocation region 106 is divided along the time axis into a nonMIMO zone 250 and a MIMO zone 260. The nonMIMO zone 250 is divided along the frequency axis into four regions, i.e., a nonMIMO&boosting region 252, a nonMIMO&normal region 254, a nonMIMO&deboosting region 256, and a nonMIMO&HARQ region 258. The MIMO zone 260 is divided along the frequency axis into four regions, i.e., a MIMO&boosting region 262, a MIMO&normal region 264, a MIMO&deboosting region 266, and a MIMO&HARQ region 268. Herein, nonMIMO includes SISO and SIMO. Boosting of '3 dB' is applied to bursts transmitted through the nonMIMO&boosting region 252. Deboosting of '−3 dB' is applied to bursts transmitted through the nonMIMO&deboosting region 256. The magnitude of boosting and deboosting may differ according to detailed embodiments of the present invention.

Time-axis sizes (i.e., symbol-axis sizes) of the MAP region 104 and the burst allocation region 106 are variable in an arrow direction shown in FIG. 2B. Likewise, time-axis sizes of the nonMIMO zone 250 and the MIMO zone 260 in the MAP region 104 are also variable. In addition, frequency-axis sizes (i.e., subchannel-axis sizes) of the nonMIMO&boosting region 252, the nonMIMO&normal region 254, and the nonMIMO&deboosting region 256, the nonMIMO&HARQ region 258, the MIMO&boosting region 262, the MIMO&normal region 264, the MIMO&deboosting region 266, and the MIMO&HARQ region 268 are variable.

In the MIMO zone 260 shown in FIG. 2B, a MIMO&boosting burst, a MIMO&normal burst, and a MIMO&deboosting burst to be allocated to the MIMO&boosting region 262, the MIMO&normal region 264, and the MIMO&deboosting region 266 are the same as a MIMO&HARQ burst to be allocated to the MIMO&HARQ region 268 except that retransmission does not conform to the HARQ scheme. Therefore, in FIG. 2B, the MIMO&boosting region 262, the MIMO&normal region 264, the MIMO&deboosting region 266, and the MIMO&HARQ region 268 can be concatenated into a single region.

Comparing FIGS. 2A and 2B, the burst allocation region 106 of FIG. 2B is an exemplary case of using boosting or deboosting in the nonMIMO&nonHARQ region 212 and the MIMO&nonHARQ region 222 of FIG. 2A. The boosting or deboosting can also be applied to the nonMIMO&HARQ region 258 and the MIMO&HARQ region 268. However, due to a relatively low gain, boosting or deboosting is not performed on bursts conforming to the HARQ scheme according to an exemplary embodiment of the present invention.

Figure 3:
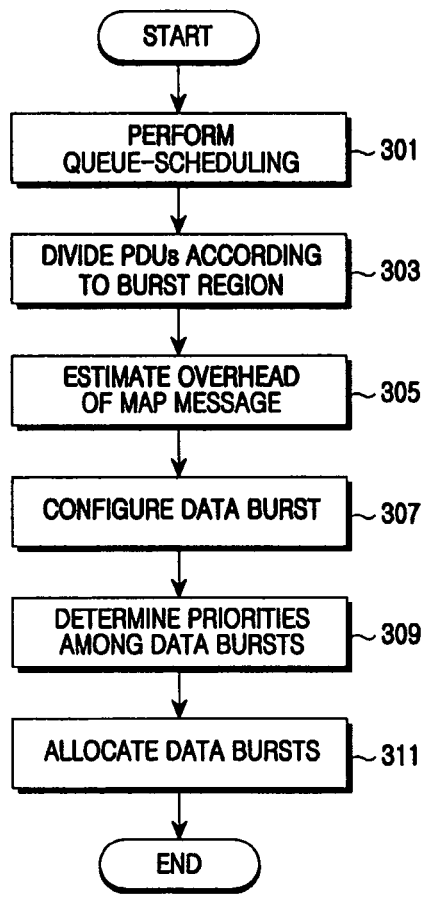
FIG. 3 is a flowchart illustrating a burst allocation process of a Base Station (BS) in a broadband wireless communication system according to an exemplary embodiment of the present invention.

FIG. 3 is a flowchart illustrating a burst allocation process of a Base Station (BS) in a broadband wireless communication system according to an exemplary embodiment of the present invention.

Referring to FIG. 3, the BS performs queue-scheduling to determine transmission priorities among Packet Data Units (PDUs) in step 301. The priorities are preferentially determined according to service classes, and thereafter are determined according to a connection corresponding to each PDU in each service class. The PDU is a basic unit of dividing data in a physical layer.

After performing the queue-scheduling, the BS classifies the PDUs according to a burst region in step 303. For example, the BS classifies the PDUs according to the burst regions divided as shown in FIG. 2A or FIG. 2B.

In step 305, the BS estimates an overhead of a MAP message for indicating burst allocation information. That is, to know a resource amount of the available burst allocation region 106, the BS estimates a resource amount occupied by the MAP message in a DL frame.

After estimating the overhead of the MAP message, the BS configures data bursts in step 307. In other words, the BS concatenates the data bursts so that PDUs to be transmitted to the same MS and PDUs applied with the same Modulation and Coding Scheme (MCS) level can be concatenated into one burst. The MCS level is a value that indicates one of combinations of a classified data modulation scheme and a channel coding scheme. The PDUs to be transmitted to the same MS imply PDUs having the same Basic-Connection IDentifier (B-CID). For example, in case of a nonMIMO&nonHARQ burst, the PDUs having the same MCS level are configured into one burst. In case of a nonMIMO&HARQ burst, a MIMO&nonHARQ burst, and a MIMO&HARQ burst, the PDUs to be transmitted to the same MS, i.e., the PDUs having the same B-CID, are configured into one burst.

After configuring the data bursts, the BS determines priorities among the data bursts in step 309. The priorities are determined independently in each sub-region divided by burst property. That is, the BS determines a priority of each data burst by using a priority of a PDU having a lowest priority among the PDUs included in each data burst. In other words, the priority of each data burst depends on the priority of the PDU having the lowest priority among the PDUs included in each data burst.

Thereafter, proceeding to step 311, the BS allocates the data bursts on the basis of the transmission priorities according to the queue-scheduling result.

In the exemplary embodiment of the resource allocation process of FIG. 3, step 305 is performed to estimate a size of the MAP message. By estimating the size of the MAP message, the BS can recognize a size of the available burst allocation region 106, and can effectively allocate resources.

To estimate the size of the MAP message, the BS sequentially selects a PDU to be transmitted according to a priority, and calculates a resource amount required for transmitting the MAP message in every PDU selection. At the same time, whenever the PDU is additionally selected, the BS calculates a maximum resource amount for data allocation on the basis of the resource amount required for transmitting the MAP message, calculates a resource amount required for transmitting the selected PDUs, and thereafter determines whether the selected PDUs can be transmitted. During a time when the aforementioned operation is repeated, if the resource amount required for transmitting the PDU is greater than or equal to the maximum resource amount available for data allocation, the BS determines a MAP message size calculated at that time as a final estimation value.

A detailed operation and structure of the BS to estimate the MAP message size as described above will be described below.

Figure 4:
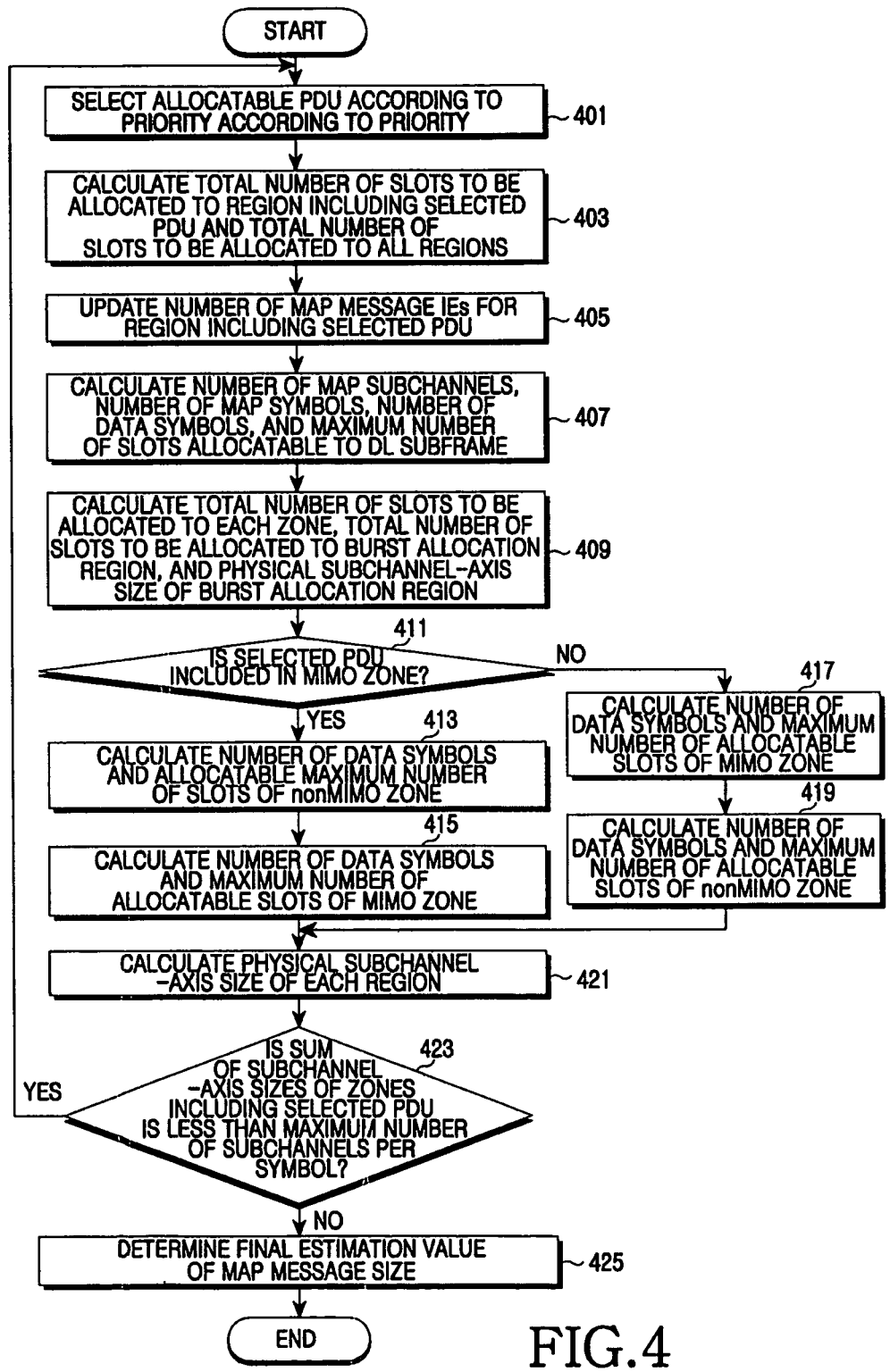
FIG. 4 is a flowchart illustrating a process of estimating a MAP message size by a BS in a broadband wireless communication system according to a first embodiment of the present invention.

FIG. 4 is a flowchart illustrating a process of estimating a MAP message size by a BS in a broadband wireless communication system according to a first embodiment of the present invention. In the process of estimating the MAP message size shown in FIG. 4, the burst allocation region 106 of the DL subframe of FIG. 2A is used.

Referring to FIG. 4, in step 401, the BS selects one allocable PDU from a plurality of PDUs according to the priorities which are determined in step 301 of FIG. 3. That is, the BS selects a PDU having an $n^{th}$ scheduling priority to estimate the MAP message size, where n is initialized to one (1) when this process starts, and is incremented by one (1) whenever this process is repeated. In this case, the BS selects one PDU from PDUs having an effective capacity. The effective capacity implies a capacity exceeding zero (0) bytes.

After selecting one allocable PDU, proceeding to step 403, the BS calculates the total number of slots to be allocated to a region including the selected PDU, that is, the PDU having the $n^{th}$ scheduling priority, and the total number of slots to be allocated to all regions. For example, if the selected PDU is included in the nonMIMO&nonHARQ region 212, the BS increments the number of slots to be allocated to the nonMIMO&nonHARQ region 212 and the total number of slots to be allocated to all regions by the number of slots to be occupied by the selected PDU. In other words, the BS calculates the number of slots to be allocated to the region including the PDU having the $n^{th}$ scheduling priority for transmitting a PDU having a first ($1^{st}$) scheduling priority through a PDU having the $n^{th}$ scheduling priority, and also calculates the total number of slots to be allocated to all regions. Herein, the total number of slots to be allocated to all regions includes the number of slots of a PDU to be fragmented due to exceeding the maximum number of slots that can be included in the DL subframe.

In step 405, the BS updates the number of MAP message Information Elements (IEs) for the region including the selected PDU. That is, if burst allocation information on the region including the selected PDU is added to the MAP message due to the selected PDU in step 401, the BS increments the number of corresponding MAP message IEs.

For example, when the selected PDU is included in the nonMIMO&nonHARQ region 212, if the same MCS level as that of the selected PDU does not exist in MCS levels of PDUs included in the previously selected nonMIMO&nonHARQ region 212, the BS increments the number of MAP IEs by one (1). The MAP IE is a MAP message IE indicating resource allocation information of a burst included in the nonMIMO&nonHARQ region 212.

Alternatively, when the selected PDU is included in the nonMIMO&HARQ region 214, if the same receiving MS as that of the selected PDU does not exist in receiving MSs of PDUs included in the nonMIMO&HARQ region 214, the BS increments the number of nonMIMO&HARQ sub-burst IEs by one (1). The receiving MS of the PDU is confirmed using B-CID information included in each PDU. The nonMIMO&HARQ sub-burst IE is a MAP message IE indicating resource allocation information of a burst included in the nonMIMO&HARQ region 214.

When the selected PDU is included in the nonMIMO&HARQ region 214, if the same MCS level as that of the selected PDU does not exist in MCS levels of PDUs included in the nonMIMO&HARQ region 214, the BS increments the number of Downlink Interval Usage Code (DIUC) changes by one (1). The DIUC change is a MAP message IE indicating an MCS level change among bursts included in the nonMIMO&HARQ region 214.

Alternatively, when the selected PDU is included in the MIMO&nonHARQ region 222, if the same receiving MS as that of the selected PDU does not exist in receiving MSs of PDUs included in the MIMO&nonHARQ region 222, the BS increments the number of MIMO&nonHARQ sub-burst IEs by one (1). The receiving MS of the PDU is confirmed using B-CID information included in each PDU. The MIMO&nonHARQ sub-burst IE is a MAP message IE indicating resource allocation information of a burst included in the MIMO&nonHARQ region 222.

Alternatively, when the selected PDU is included in the MIMO&HARQ region 224, if the same receiving MS as that of the selected PDU does not exist in receiving MSs of PDUs included in the MIMO&HARQ region 224, the BS increments the number of MIMO&HARQ sub-burst IEs by one (1). The receiving MS of the PDU is confirmed using B-CID information included in each PDU. The MIMO&HARQ sub-burst IE is a MAP message IE indicating resource allocation information of a burst included in the MIMO&HARQ region 224.

In step 407, the BS calculates the number of MAP subchannels, the number of MAP symbols, the number of data symbols, and the maximum number of slots allocable to the DL subframe on the basis of the number of MAP message IEs updated in step 405. That is, the BS calculates the number of subchannels to be occupied by a MAP message including allocation information of the PDU having the $1^{st}$ scheduling priority through the PDU having the $n^{th}$ scheduling priority, the number of symbols to be occupied by the MAP message, the number of symbols allocable to data, and the maximum number of slots allocable to the DL subframe. The number of MAP subchannels and the number of MAP symbols are determined according to the number of MAP message IEs updated in step 405. The number of data symbols and the maximum number of slots allocable to the DL subframe are relatively determined according to the number of MAP subchannels and the number of MAP symbols. For example, if 30 slots are included for every two symbols in a structure of a frame in use, the aforementioned variables are calculated by Equations 1A-1D:

No. of MAP slots=ceil(No. of MAP bits/48)×6+4
(=No. of FCH slots). [EQN. 1A]

No. of MAP symbols=ceil(No. of MAP slots/30
(=Max. No. of subchannels per symbol))×2. [EQN. 1B]

No. of data symbols(=$So$)=27−(1(=No. of preamble
symbols)+No. of MAP symbols). [EQN. 1C]

Max. No. of slots allocable to DL subframe(=No)=30
(=Max. No. of subchannels per symbol)×$So$/2 [EQN. 1D]

In Equations 1A-1D above, the ceil( ) denotes a ceiling operator. The number of MAP bits and the number of MAP slots are calculated by Equation 2:

No. of MAP bits=No. of DL MAP bits+No. of UL
MAP bits+32(=No. of CRC bits) [EQN. 2]

In Equation 2 above, the number of DL MAP bits and the number of UL MAP bits are calculated by Equations 3A-3B:

No. of DL MAP bits=ReqInfo_DL_Common+
ReqInfo_nonMIMO&nonHARQ+
ReqInfo_nonMIMO&HARQ+Bits_for_MI-
MO_region. [EQN. 3A]

No. of UL MAP bits=ReqInfo_UL_Common+
ReqInfo_UL_nonMIMO&nonHARQ+
ReqInfo_UL_nonMIMO&HARQ+
ReqInfo_UL_MIMO [EQN. 3B]

In Equations 3A-3B above, the ReqInfo_DL_Common, the ReqInfo_nonMIMO&nonHARQ, the ReqInfo_nonMIMO&HARQ, and the Bits_for_MIMO_region are calculated by Equations 4A-4 below. In addition, the ReqInfo_UL_Common, the ReqInfo_UL_nonMIMO&nonHARQ, the ReqInfo_UL_nonMIMO&HARQ, and the ReqInfo_UL_MIMO are calculated by Equations 5A-5D below.

ReqInfo_DL_Common=88+36×UL_N_I_LEVE-
L_IE+44×STC_DL_ZONE_IE [EQN. 4A]

ReqInfo_nonMIMO&nonHARQ=36×dl_map_ie_cnt+
CID_SWITCH_IE×(8×dl_map_ie_cnt+16×ci-
ds_in_dl_map_cnt) [EQN. 4B]

ReqInfo_nonMIMO&HARQ=76+32×dl_HARQ_
sub_burst_ie_cnt+8×diuc_change_cnt+16×
NUM_CQI_ALLOC_CHANGE+4×
NUM_DEALLOC_CQICH [EQN. 4C]

Bits_for_MIMO_region=44+20+
Bits_for_MIMO&nonHARQ_region+
Bits_for_MIMO&HARQregion [EQN. 4D]

Bits_for_MIMO&nonHARQ_region=48+10+31×
dl_MIMO&nonHARQ_sub_burst_ie_cnt+12×
dedicated_MIMO_dl_control_ie_mode1_
nonHARQ_cnt [EQN. 4E]

Bits_for_MIMO&HARQ_region=48+10+2+36×
dl_MIMO&HARQ_sub_burst_ie_cnt+12×dedi-
cated_MIMO_dl_control_ie_mode1_
HARQ_cnt [EQN. 4F]

In Equations 4A-4F (4) above, the UpLink Noise Interference LEVEN Information Element (UL_N_I_LEVEL_IE) denotes a UL interference and noise level which is broadcast by the BS to MSs belonging to a coverage of the BS to provide open-loop power control. The Space Time Coding DownLink ZONE Information Element (STC_DL_ZONE$_{13}$ IE) indicates a detailed permutation or a detailed transmit diversity mode and is included in a DL MAP when transmitted. The downlink map information element count (dl_map_ie_cnt) denotes the number of DL MAP IEs. The Connection IDentifier SWITCH Information Element (CID_SWITCH_IE) denotes an IE inserted when an inclusion or exclusion of a CID parameter is toggled in the DL MAP. The connection identifier in downlink map count (cids_in_dl_map_cnt) denotes the number of CIDs to be included in the DL MAP. The downlink HARQ sub burst information element count (dl_HARQ_sub_burst_ie_cnt) denotes a data region to be allocated with bursts corresponding to respective HARQ modes constituting an HARQ DL MAP IE, that is, denotes the number of subbursts. The downlink information usage code change count (diuc_change_cnt) is included in the dl_Harq_sub_burst_ie and denotes that eight (8) bits are added when DIUC is changed in a burst allocation process. The Number Channel Quality Information Allocation CHANGE (NUM_CQI_ALLOC_CHANGE) denotes the number of CQI feedbacks transmitted by the MS through CQI channels indexed with CQI indices during a specific frame. The Number Deallocation Channel Quality Information CHannel (NUM_DEALLOC_CQICH) denotes the number of CQI feedbacks released when the CQI feedbacks transmitted through the CQI channels are successfully received. The downlink MIMO&nonHARQ sub burst information element count (dl_MIMO&nonHARQ_sub_burst_ie_cnt) denotes the number of MIMO&nonHARQ subbursts. The dedicated MIMO downlink control information element mode1 non-HARQ count (dedicated_MIMO_dl_control_ie_mode1_nonHARQ_cnt) denotes the number of dedicated DL control IEs for MIMO, wherein the dedicated DL control IEs are used to include additional control information for the MIMO&nonHARQ bursts. The downlink MIMO&HARQ sub burst information element count (dl_MIMO&HARQ_sub_burst_ie_cnt) denotes the number of MIMO&HARQ subbursts. The dedicated MIMO downlink control information element mode1 HARQ count (dedicated_MIMO_dl_control_ie_mode1_HARQ_cnt) denotes the number of dedicated DL control IEs for MIMO, wherein the dedicated DL control IEs are used to include additional control information for the MIMO&HARQ bursts.

$$\text{ReqInfo\_UL\_Common} = 48 + 212 \times \text{UL\_CONTROL\_CH\_IE} + 60\_\text{CDMA\_ALLOC\_IE} \quad [\text{EQN. 5A}]$$

$$\text{ReqInfo\_UL\_nonMIMO\&nonHARQ} = 32 \times \text{UL\_MAP\_IE\_cnt} \quad [\text{EQN. 5B}]$$

$$\text{ReqInfo\_UL\_nonMIMO\&HARQ} = 44 + 36 \times \text{UL\_HARQ\_SUB\_BURST\_IE\_cnt} \quad [\text{EQN. 5C}]$$

$$\text{ReqInfo\_UL\_MIMO} = 60 + 36 \times \text{UL\_MIMO\_SUB\_BURST\_IE\_cnt} + 12 \times 2 \quad [\text{EQN. 5D}]$$

In Equations 5A-5D above, the Uplink Control Channel Information Element (UL_CONTROL_CH_IE) denotes information on initial ranging, periodic & bandwidth ranging, fast-feedback channels, and an ACKnowledgment (ACK) channel. The Code Division Multiple Access Allocation up-MAP Information Element (CDMA_ALLOC_IE) denotes a UL MAP IE for allocating a bandwidth to a user whose bandwidth is requested using a CDMA request code. The Uplink MAP Information Element Count (UL_MAP_IE_Cnt) denotes the number of UL MAP IEs to be transmitted through a UL frame. The Uplink HARQ SUB BURST Information Element count (UL_HARQ_SUB_BURST_IE_cnt) is included in an HARQ UL MAP IE, and denotes a data region to which bursts are allocated for respective HARQ modes constituting the HARQ UL MAP IE, that is, denotes the number of subbursts. The UpLink MIMO SUB BURST Information Element count (UL_MIMO_SUB_BURST_IE_cnt) denotes the number of UL MIMO subbursts.

In step 409, the BS calculates the total number of slots to be allocated to each zone (i.e., the nonMIMO zone 210 and the MIMO zone 220) for transmitting the PDU having the $1^{st}$ scheduling priority through the PDU having the $n^{th}$ scheduling priority, the total number of slots to be allocated to the burst allocation region 106, and a physical subchannel-axis size of the burst allocation region 106. In other words, the BS calculates the number of slots to be allocated to each zone, and sums the calculated numbers to calculate the number of slots to be allocated to the burst allocation region 106. Further, the BS calculates the subchannel-axis size of the burst allocation region 106 by dividing the number of slots to be allocated to the burst allocation region 106 by the number of symbols of the burst allocation region 106.

In step 411, the BS determines whether the selected PDU is included in the MIMO zone 220.

If the selected PDU is included in the MIMO zone 220, proceeding to step 413, the BS calculates the number of data symbols of the nonMIMO zone 210 and the maximum number of slots allocable to the nonMIMO zone 210. That is, to guarantee a Quality of Service (QoS) of PDU transmission, the BS preferentially calculates the number of data symbols and the maximum number of allocable slots of a zone not including a PDU having a lowest priority at a current time.

In step 415, the BS calculates the number of data symbols and the maximum number of allocable slots of the MIMO zone 220. The number of data symbols of the MIMO zone 220 is relatively determined by the number of data symbols calculated in step 413 for the nonMIMO zone 210.

If the determination result of step 411 shows that the selected PDU is not included in the MIMO zone 220, that is, if the selected PDU is included in the nonMIMO zone 210, proceeding to step 417, the BS calculates the number of data symbols of the MIMO zone 220 and the maximum number of slots allocable to the MIMO zone 220. That is, to guarantee the QoS of PDU transmission, the BS preferentially calculates the number of data symbols and the maximum number of allocable slots of the zone not including the PDU having the lowest priority at the current time.

In step 419, the BS calculates the number of data symbols and the maximum number of allocable slots of the nonMIMO zone 210. The number of data symbols of the nonMIMO zone 210 is relatively determined by the number of data symbols calculated in step 417 for the MIMO zone 220.

After calculating the number of data symbols and the maximum number of allocable slots of each zone, proceeding to step 421, the BS calculates a physical subchannel-axis size of each region, that is, the nonMIMO&nonHARQ region 212, the nonMIMO&HARQ region 214, the MIMO&nonHARQ region 222, and the MIMO&HARQ region 224. For example, the physical subchannel-axis size of each region is calculated by Equation 6:

$$\text{Physical } Fo\{\text{region}\} = \text{ceil}(N\{\text{region}\}/\text{No. of symbols of region}) \quad [\text{EQN. 6}]$$

In Equation 6 above, the Physical Fo{region} denotes a physical subchannel-axis size of a 'region', the ceil( ) denotes a ceiling operator, and the N{region} denotes the total number of slots to be allocated to the 'region'.

In step 423, the BS determines whether subchannel-axis size of a zone including the selected PDU is less than the maximum number of subchannels per symbol. For example, if the selected PDU is included in the nonMIMO&nonHARQ region 212, the BS determines whether a sum of the physical subchannel-axis size of the nonMIMO&nonHARQ region 212 and the physical subchannel-axis size of the nonMIMO&HARQ region 214 is less than the maximum number of subchannels per symbol.

If the subchannel-axis size of the zone including the selected PDU is less than the maximum number of subchannels per symbol, returning to step 401, the BS selects an allocable PDU having a next priority, and thereafter steps 403 through 417 are repeated. That is, the BS increments n by one (1), and thereafter the procedure returns to step 401.

Otherwise, if the subchannel-axis size of the zone including the selected PDU is greater than or equal to the maximum number of subchannels per symbol, proceeding to step 425, the BS determines a final estimation value of the MAP message size. That is, the BS determines the MAP message size calculated at the current time as the final estimation value.

Figure 5A:
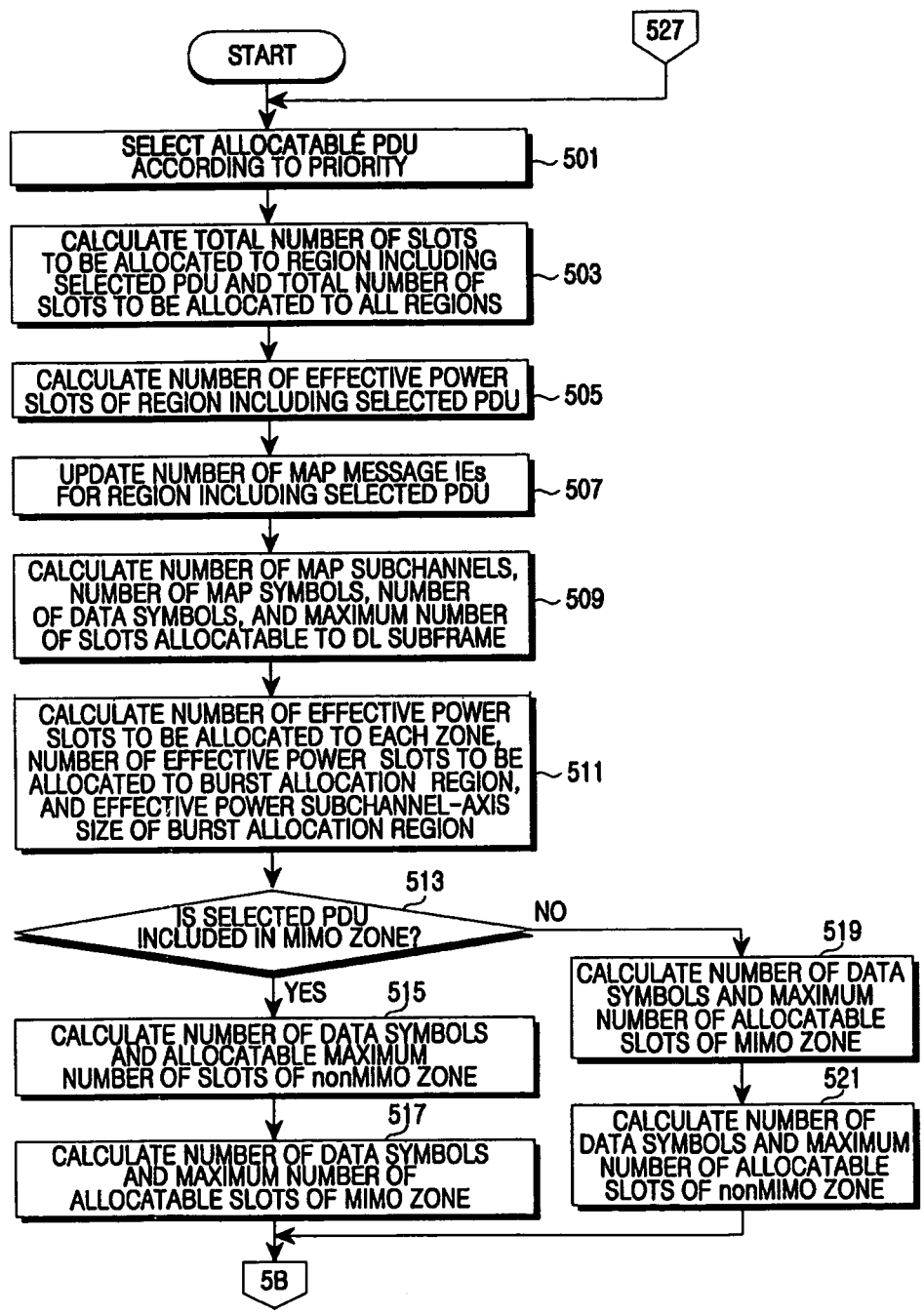
FIGS. 5A and 5B are flowcharts illustrating a process of estimating a MAP message size by a BS in a broadband wireless communication system according to a second embodiment of the present invention.
Figure 5B:
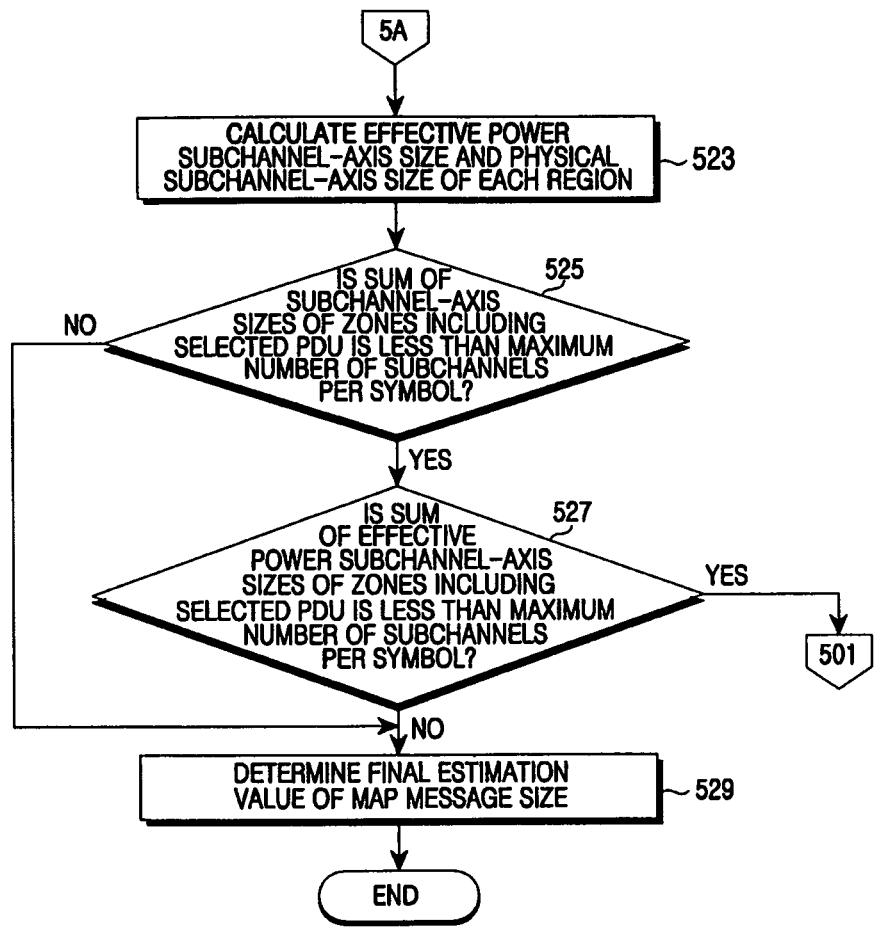

FIGS. 5A and 5B are flowcharts illustrating a process of estimating a MAP message size by a BS in a broadband wireless communication system according to a second embodiment of the present invention. In the process of estimating the MAP message size shown in FIGS. 5A and 5B, the burst allocation region 106 of the DL subframe of FIG. 2B is used.

Referring to FIGS. 5A and 5B, in step 501, the BS selects one allocable PDU from a plurality of PDUs according to the priorities which are determined in step 301 of FIG. 3. That is, the BS selects a PDU having an $n^{th}$ scheduling priority to estimate the MAP message size, where n is initialized to one (1) when this process starts, and is incremented by one (1) whenever this process is repeated. In this case, the BS selects one PDU from PDUs having an effective capacity. The effective capacity implies a capacity exceeding zero (0) bytes.

After selecting one allocable PDU, proceeding to step 503, the BS calculates the total number of slots to be allocated to a region including the selected PDU that is, the PDU having the $n^{th}$ scheduling priority, and the total number of slots to be allocated to all regions. For example, if the selected PDU is included in the nonMIMO&boosting region 252, the BS increments the number of slots to be allocated to the nonMIMO&boosting region 252 and the total number of slots to be allocated to all regions by the number of slots to be occupied by the selected PDU. In other words, the BS calculates the number of slots to be allocated to the region including the PDU having the $n^{th}$ scheduling priority for transmitting a PDU having a $1^{st}$ scheduling priority through the PDU having the $n^{th}$ scheduling priority, and also calculates the total number of slots to be allocated to all regions. The total number of slots to be allocated to all regions includes the number of slots of a PDU to be fragmented due to exceeding the maximum number of slots that can be included in the DL subframe.

In step 505, the BS calculates the number of effective power slots of a region including the selected PDU, that is, the PDU having the $n^{th}$ scheduling priority. The number of effective power slots is obtained by applying an effect caused by signal power to the number of physical slots, and is calculated by Equation 7:

$$\text{Effective Power Slot}\{\text{region}\} = \alpha \times N\{\text{region}\} \qquad [\text{EQN. 7}]$$

In Equation 7 above, the Effective Power Slot{region} denotes the number of effective power slots of a 'region', the a denotes a weight, and the N{region} denotes the total number of slots required to transmit data of the 'region'.

In Equation 7 above, the weight a varies according to a boosting or deboosting level applied to a region including the selected PDU. For example, when boosting of '3 dB' is applied in the region, the weight α is set to two (2), and when deboosting of '−3 dB' is applied in the region, the weight α is set to zero point five (0.5). That is, the weight α is a normal scale value having a signal power ratio that varies by boosting or deboosting.

In step 507, the BS updates the number of MAP message IEs for the region including the selected PDU. That is, if burst allocation information on the region including the selected PDU is added to the MAP message due to the selected PDU, the BS increments the number of corresponding MAP message IEs.

For example, when the selected PDU is included in the nonMIMO&boosting region 252, the nonMIMO&normal region 254, or the nonMIMO&deboosting region 256, if the same MCS level as that of the selected PDU does not exist in MCS levels of PDUs included in the previously selected nonMIMO&boosting region 252, the nonMIMO&normal region 254, or the nonMIMO&deboosting region 256, the BS increments the number of MAP IEs by one (1). The MAP IE is a MAP message IE indicating resource allocation information of a burst included in the nonMIMO&boosting region 252, the nonMIMO&normal region 254, or the nonMIMO&deboosting region 256.

Alternatively, when the selected PDU is included in the nonMIMO&HARQ region 258, if the same receiving MS as that of the selected PDU does not exist in receiving MSs of PDUs included in the nonMIMO&HARQ region 258, the BS increments the number of nonMIMO&HARQ sub-burst IEs by one (1). The receiving MS of the PDU is confirmed using B-CID information included in each PDU. The nonMIMO&HARQ sub-burst IE is a MAP message IE indicating resource allocation information of a burst included in the nonMIMO&HARQ region 258.

When the selected PDU is included in the nonMIMO&HARQ region 258, if the same MCS level as that of the selected PDU does not exist in MCS levels of PDUs included in the nonMIMO&HARQ region 258, the BS increments the number of DIUC changes by one (1). The DIUC change is a MAP message IE indicating an MCS level change among bursts included in the nonMIMO&HARQ region 258.

Alternatively, when the selected PDU is included in the nonMIMO&boosting region 262, the nonMIMO&normal region 264, or the nonMIMO&deboosting region 266, if the same receiving MS as that of the selected PDU does not exist in receiving MSs of PDUs included in the nonMIMO&boosting region 262, the nonMIMO&normal region 264, or the nonMIMO&deboosting region 266, the BS increments the number of MIMO&nonHARQ sub-burst IEs by one (1). The receiving MS of the PDU is confirmed using B-CID information included in each PDU. The MIMO&nonHARQ sub-burst IE is a MAP message IE indicating resource allocation information of a burst included in the nonMIMO&boosting region 262, the nonMIMO&normal region 264, or the nonMIMO&deboosting region 266.

Alternatively, when the selected PDU is included in the MIMO&HARQ region 268, if the same receiving MS as that of the selected PDU does not exist in receiving MSs of PDUs included in the MIMO&HARQ region 268, the BS increments the number of MIMO&HARQ sub-burst IEs by one (1). The receiving MS of the PDU is confirmed using B-CID information included in each PDU. The MIMO&HARQ sub-burst IE is a MAP message IE indicating resource allocation information of a burst included in the MIMO&HARQ region 268.

In step 509, the BS calculates the number of MAP subchannels, the number of MAP symbols, the number of data symbols, and the maximum number of slots allocable to the DL subframe on the basis of the number of updated MAP message IEs. That is, the BS calculates the number of subchannels to be occupied by a MAP message including allocation information of the PDU having the $1^{st}$ scheduling priority through the PDU having the $n^{th}$ scheduling priority, the number of symbols to be occupied by the MAP message, the number of symbols allocable to data, and the maximum number of slots allocable to the DL subframe. The number of MAP subchannels and the number of MAP symbols are determined according to the number of MAP message IEs updated in step 507. The number of data symbols and the maximum number of slots allocable to the DL subframe are relatively determined according to the number of MAP subchannels and the number of MAP symbols. For example, if thirty (30)

slots are included for every two symbols in a structure of a frame in use, the aforementioned variables are calculated by Equations 8A-8D:

No. of MAP slots=ceil(No. of MAP bits/48)×6+4
(=No. of FCH slots)   [EQN. 8A]

No. of MAP symbols=ceil(No. of MAP slots/30
(==Max. No. of subchannels per symbol))×2   [EQN. 8B]

No. of data symbols(=So)=27−(1(=No. of preamble
symbols)+No. of MAP symbols)   [EQN. 8C]

Max. No. of slots allocable to DL subframe(=No)=30
(=Max. No. of subchannels per symbol)×So/2   [EQN. 8D]

In Equations 8A-8D above, the ceil( ) denotes a ceiling operator. The number of MAP bits and the number of MAP slots are calculated by Equation 9:

No. of MAP bits=No. of DL MAP bits+No. of UL
MAP bits+32(=No. of CRC bits)   [EQN. 9]

In Equation 9 above, the number of DL MAP bits and the number of UL MAP bits are calculated by Equations 10A-10B:

No. of DL MAP bits=ReqInfo_DL_Common+
ReqInfo_nonMIMO&nonHARQ+
ReqInfo_nonMIMO&HARQ+Bits_for_MI-
MO_region   [EQN. 10A]

No. of UL MAP bits=ReqInfo_UL_Common+
ReqInfo_UL_nonMIMO&nonHARQ+
ReqInfo_UL_nonMIMO&HARQ+ReqInfo_
UL_MIMO   [EQN. 10B]

In Equations 10A-10B above, the ReqInfo_DL_Common, the ReqInfo_nonMIMO&nonHARQ, the ReqInfo_nonMIMO&HARQ, and the Bits_for_MIMO_region are calculated by Equations 11A-11F below. In addition, the ReqInfo_UL_Common, the ReqInfo_UL_nonMIMO&nonHARQ, the ReqInfo_UL_nonMIMO&HARQ, and the ReqInfo_UL_MIMO are calculated by Equations 12A-12D below.

ReqInfo_DL_Common=88+36×UL_N_I_LEVE-
L_IE+44×STC_DL_ZONE_IE   [EQN. 11A]

ReqInfo_nonMIMO&nonHARQ=36×dl_map_ie_cnt+
CID_SWITCH_IE×(8×dl_map_ie_cnt+16×
cids,in_dl_map_cnt)   [EQN. 11B]

ReqInfo_nonMIMO&HARQ=76+32×dl_HARQ_
sub_burst_ie_cnt+8×diuc_change_cnt+16×
NUM_CQI_ALLOC_CHANGE+4×NUM_
DEALLOC_CQICH tm   [EQN. 11C]

Bits_for_MIMO&nonHARQ_region=48+10+31×
dl_MIMO&nonHARQ_sub_burst_ie_cnt+12×
dedicated_MIMO_dl_control_ie_mode1_
NonHarq_cnt   [EQN. 11D]

Bits_for_MIMO&HARQ_region=48+10+2+36×
dl_MIMO&HARQ_sub_burst_ie_cnt+12×dedi-
cated_MIMO_dl_control_ie_mode1_
Harq_cnt   [EQN. 11E]

Bits_for_MIMO_region=44+20+Bits_for_MIMO_
Boost_region+Bits_for_MIMO_Normal_region+
Bits_for_MIMO_Deboost_region+
Bits_for_MIMO&HARQregion   [EQN. 11F]

In Equations 11A-11F, the Uplink Noise Interference Level Information Element (UL_N_I_LEVEL_IE) denotes a UL interference and noise level which is broadcast by the BS to MSs belonging to a coverage of the BS to provide open-loop power control. The Space Time Coding Downlink Zone Information Element (STC_DL_ZONE_IE) indicates a detailed permutation or a detailed transmit diversity mode and is included in a DL MAP when transmitted. The downlink map information element count (dl_map_ie_cnt) denotes the number of DL MAP IEs. The Connection Identifier Switch Information Element (CID_SWITCH_IE) denotes an IE inserted when an inclusion or exclusion of a CID parameter is toggled in the DL MAP. The connection identifier in downlink map count (cids_in_dl_map_cnt) denotes the number of CIDs to be included in the DL MAP. The downlink HARQ sub burst information element count (dl_HARQ_sub_burst_ie_cnt) denotes a data region to be allocated with bursts corresponding to respective HARQ modes constituting a HARQ DL MAP IE, that is, denotes the number of subbursts. The downlink information usage code change count (diuc_change_cnt) is included in the dl_Harq_sub_burst_ie and denotes that eight (8) bits are added when DIUC is changed in a burst allocation process. The Number Channel Quality Information Allocation Change (NUM_CQI_ALLOC_CHANGE) denotes the number of CQI feedbacks transmitted by the MS through CQI channels indexed with CQI indices during a specific frame. The Number De-allocation Channel Quality Information Channel (NUM_DEALLOC_CQICH) denotes the number of CQI feedbacks released when the CQI feedbacks transmitted through the CQI channels are successfully received. The dedicated MIMO downlink control information element model nonHARQ count (dedicated_MIMO_dl_control_ie_mode1_nonHARQ_cnt) denotes the number of dedicated DL control IEs for MIMO, wherein the dedicated DL control IEs are used to include additional control information for the MIMO&nonHARQ bursts. The downlink MIMO&HARQ sub burst information element count (dl_MIMO&HARQ_sub_burst_ie_cnt) denotes the number of MIMO&HARQ subbursts. The dedicated MIMO downlink control information element model HARQ count (dedicated_MIMO_dl_control_ie_mode1_HARQ_cnt) denotes the number of dedicated DL control IEs for MIMO, wherein the dedicated DL control IEs are used to include additional control information for the MIMO&HARQ bursts. The Bit_for_MIMO_Boost_region denotes the total number of bits of allocation information on MIMO&boosting bursts. The Bit_for_MIMO_Normal_region denotes the total number of bits of allocation information on MIMO&normal bursts. The Bit_for_MIMO_Deboost_region denotes the total number of bits of allocation information for MIMO&deboosting bursts. The Bit_for_MIMO_HARQ_region denotes the total number of bits of allocation information on MIMO&HARQ bursts.

ReqInfo_UL_Common=48+212×UL_CON-
TROL_CH_IE+60×CDMA_ALLOC_IE.   [EQN. 12A]

ReqInfo_UL_nonMIMO&nonHARQ=32×
UL_MAP_IE_cnt.   [EQN. 12B]

ReqInfo_UL_nonMIMO&HARQ=44+36×
UL_HARQ_SUB_BURST_IE_cnt.   [EQN. 12C]

ReqInfo_UL_MIMO=60+36×UL_MIMO_SUB_
BURST_IE_cnt+12×2   [EQN. 12D]

In Equations 12A-12D above, the Uplink Control Channel Information Element (UL_CONTROL_CH_IE) denotes information on initial ranging, periodic & bandwidth ranging, fast-feedback channels, and an ACK channel. The Code Division Multiple Access Allocation up-MAP Information Element (CDMA_ALLOC_IE) denotes a UL MAP IE for allocating a bandwidth to a user whose bandwidth is requested using a CDMA request code. The Uplink MAP Information Element Count (UL_MAP_IE_Cnt) denotes the number of UL MAP IEs to be transmitted through the UL frame. The UpLink HARQ SUB BURST Information Element count (UL_HARQ_SUB_BURST_IE_cnt) is included in an HARQ UL MAP IE, and denotes a data region to which bursts are allocated for respective HARQ modes constituting the HARQ UL MAP IE, that is, denotes the number of subbursts. The Uplink MIMO SUB BURST Information Element count (UL_MIMO_SUB_BURST_IE_cnt) denotes the number of UL MIMO subbursts.

In step 511, the BS calculates the number of effective power slots to be allocated to each zone (i.e., the nonMIMO zone 250 and the MIMO zone 260) for transmitting the PDU having the $1^{st}$ scheduling priority through the PDU having the $n^{th}$ scheduling priority, the number of effective power slots to be allocated to the burst allocation region 106, and an effective power subchannel-axis size of the burst allocation region 106. The number of effective power slots to be allocated to the burst allocation region 106 is a sum of the number of effective power slots to be allocated to the nonMIMO zone 250 and the number of effective power slots to be allocated to the MIMO zone 260. The effective power subchannel-axis size to be assigned to the burst allocation region 106 is obtained by dividing the number of effective power slots to be allocated to the burst allocation region 106 by the number of symbols of the burst allocation region 106.

In step 513, the BS determines whether the selected PDU is included in the MIMO zone 260.

If the selected PDU is included in the MIMO zone 260, proceeding to step 515, the BS calculates the number of data symbols of the nonMIMO zone 250 and the maximum number of slots allocable to the nonMIMO zone 250. That is, to guarantee a QoS of PDU transmission, the BS preferentially calculates the number of data symbols and the maximum number of allocable slots of a zone not including a PDU having a lowest priority at a current time.

In step 517, the BS calculates the number of data symbols of the MIMO zone 260 and the maximum number of allocable slots of the MIMO zone 260. The number of data symbols of the MIMO zone 260 is relatively determined by the number of data symbols calculated in step 515 for the nonMIMO zone 250.

If the determination result of step 513 shows that the selected PDU is not included in the MIMO zone 260, that is, if the selected PDU is included in the nonMIMO zone 250, proceeding to step 519, the BS calculates the number of data symbols of the MIMO zone 260 and the maximum number of slots allocable to the MIMO zone 260. That is, to guarantee the QoS of PDU transmission, the BS preferentially calculates the number of data symbols and the maximum number of allocable slots of the zone not including the PDU having the lowest priority at the current time.

In step 521, the BS calculates the number of data symbols and the maximum number of allocable slots of the nonMIMO zone 250. The number of data symbols of the nonMIMO zone 250 is relatively determined by the number of data symbols calculated in step 519 for the MIMO zone 260.

After calculating the number of data symbols and the maximum number of allocable slots of each zone, proceeding to step 523, the BS calculates an effective power subchannel-axis size and a physical subchannel-axis size of each region, that is, the nonMIMO&boosting region 252, the nonMIMO&normal region 254, the nonMIMO&HARQ region 258, the nonMIMO&deboosting region 256, the nonMIMO&boosting region 262, the nonMIMO&normal region 264, the nonMIMO&deboosting region 266, and the MIMO&HARQ region 268. For example, the physical sub-channel-axis size of each region is calculated by Equation 6 above, and the effective power subchannel-axis size of each region is calculated by Equation 13:

$$\text{Effective Power } Fo\{\text{region}\} = \text{ceil}(\text{Effective Power Slot}\{\text{region}\}/\text{No. of symbols of region}) \quad [\text{EQN. 13}]$$

In Equation 13 above, the Effective Power Fo{region} denotes an effective power subchannel-axis size of a 'region', the ceil( ) denotes a ceiling operator, and the Effective Power Slot{region} denotes the number of effective power slots of the 'region'.

In step 525, the BS determines whether physical subchannel-axis size of a zone including the selected PDU is less than the maximum number of subchannels per symbol. For example, if the selected PDU is included in the nonMIMO&boosting region 252, the BS determines whether a sum of the physical subchannel-axis sizes of the nonMIMO&boosting region 262, the physical subchannel-axis size of the nonMIMO&normal region 264, the physical subchannel-axis size of the nonMIMO&deboosting region 266, and the physical subchannel-axis size of the nonMIMO&HARQ region 268 is less than the maximum number of subchannels per symbol. If the subchannel-axis size of the zone including the selected PDU is greater than or equal to the maximum number of subchannels per symbol, the procedure proceeds to step 529.

Otherwise, if the subchannel-axis sizes of the zone including the selected PDU is less than the maximum number of subchannels per symbol, proceeding to step 527, the BS determines whether the effective power subchannel-axis size of the zone including the selected PDU is less than the maximum number of subchannels per symbol. For example, if the selected PDU is included in the nonMIMO&boosting region 252, the BS determines whether a sum of the effective power subchannel-axis size of the nonMIMO&boosting region 262, the effective power subchannel-axis size of the nonMIMO&normal region 264, the effective power subchannel-axis size of the nonMIMO&deboosting region 266, and the effective power subchannel-axis size of the nonMIMO&HARQ region 268 is less than the maximum number of subchannels per symbol.

If the effective power subchannel-axis size of the zone including the selected PDU is less than the maximum number of subchannels per symbol, returning to step 501, the BS selects an allocable PDU having a next priority, and thereafter steps 503 through 521 are repeated.

Otherwise, if the subchannel-axis size of the zone including the selected PDU is greater than or equal to the maximum number of subchannels per symbol, proceeding to step 529, the BS determines a final estimation value of the MAP message size. That is, the BS determines the MAP message size calculated at a current iteration as the final estimation value.

Figure 6:
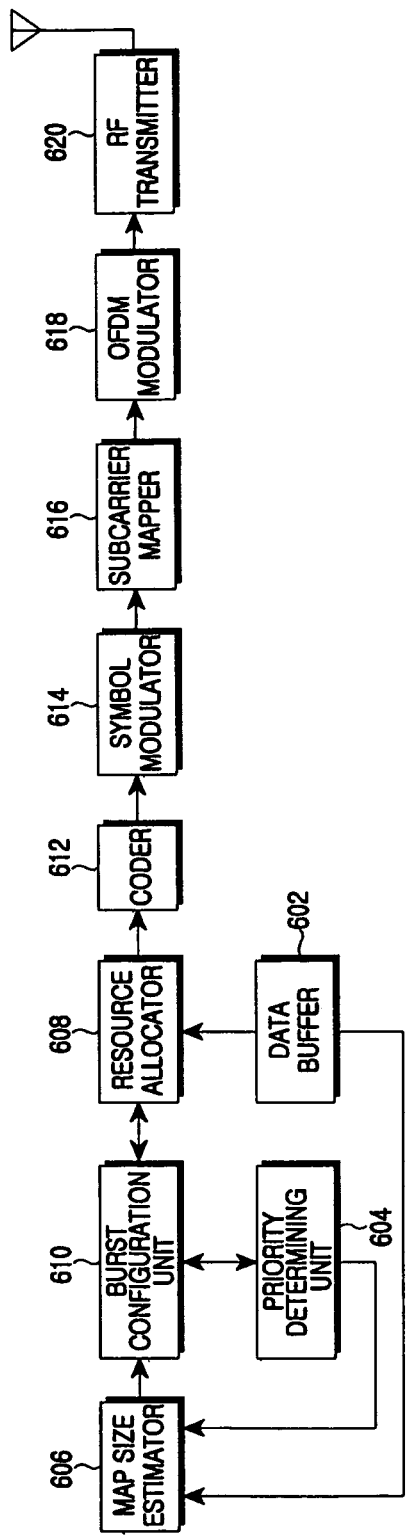
FIG. 6 is a block diagram illustrating a BS in a broadband wireless communication system according to an exemplary embodiment of the present invention.

FIG. 6 is a block diagram illustrating a BS in a broadband wireless communication system according to an exemplary embodiment of the present invention.

Referring to FIG. 6, the BS includes a data buffer 602, a priority determining unit 604, a map size estimator 606, a burst configuration unit 608, a resource allocator 610, a coder 612, a symbol modulator 614, a subcarrier mapper 616, an OFDM modulator 618, and a Radio Frequency (RF) transmitter 620.

The data buffer 602 stores PDUs to be transmitted, and provides the PDUs to the burst configuration unit 608. The priority determining unit 604 determines priorities among PDUs stored in the data buffer 602. For example, the priority determining unit 604 determines the priorities among the PDUs according to a service class of a service flow corresponding to each PDU and a user class of a receiving MS.

The map size estimator 606 estimates a size of a MAP message. That is, the map size estimator 606 estimates an overhead caused by the MAP message, and thereafter provides size information of the MAP message to the resource allocator 610. In this case, the map size estimator 606 uses priority information among PDUs and size information of the PDUs, wherein the priority information is provided from the priority determining unit 604 and the size information is provided from the data buffer 602. That is, to estimate the size of the MAP message, the map size estimator 606 selects the PDUs one by one in a descending order of the priority, and calculates an estimated amount of resources to be occupied by the MAP message and the selected PDU each selection time. A detailed structure of the map size estimator 606 is described below with reference to FIG. 7.

The burst configuration unit 608 configures data bursts by using the PDUs provided from the data buffer 602. The burst configuration unit 608 configures the PDUs transmitted to the same MS, that is, the PDUs including the same B-CID, into one data burst. Further, the burst configuration unit 608 configures the PDUs applied with the same MCS level into one data burst.

The resource allocator 610 allocates bursts to resources of a DL subframe and a UL duration. That is, the resource allocator 610 allocates bursts to be transmitted to MSs to resources of the DL subframe, and allocates bursts received from the MSs to resources of the UL duration. In this case, the resource allocator 610 evaluates a size of an available region for burst allocation within a frame according to the MAP message size information estimated by the map size estimator 606, and thereafter allocates bursts within the evaluated region.

The coder 612 performs channel-coding on an information bit-stream provided from the burst configuration unit 608. The symbol modulator 614 converts the channel-coded bit-stream into complex symbols by performing modulation. The subcarrier mapper 616 maps the complex symbols to a frequency domain according to a burst allocation result of the resource allocator 610. The OFDM modulator 618 converts the complex symbols mapped to the frequency domain into a time-domain signal by performing an Inverse Fast Fourier Transform (IFFT) operation, and configures an OFDM symbol by inserting a Cyclic Prefix (CP). The RF transmitter 620 up-converts a baseband signal into an RF signal and transmits the RF signal through an antenna.

Figure 7:
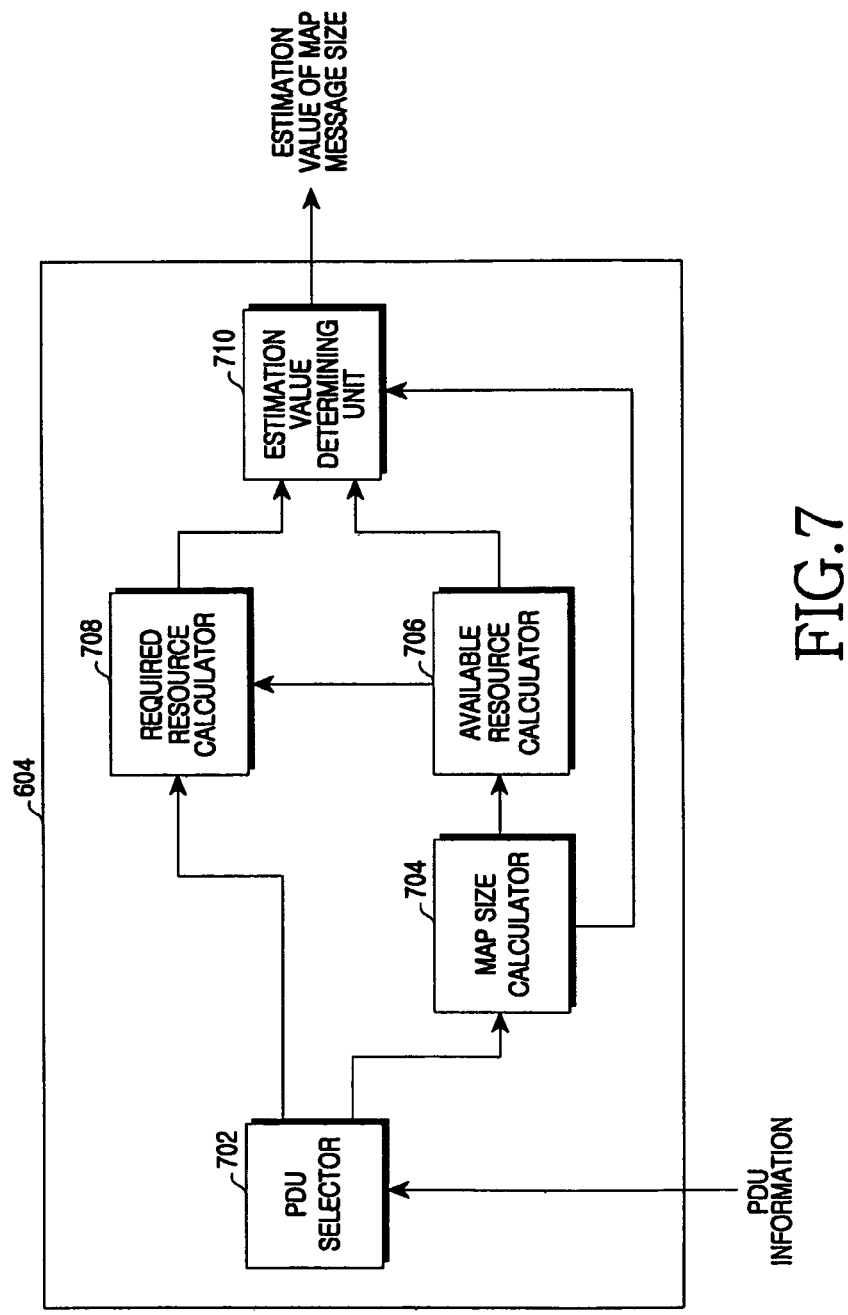
FIG. 7 is a block diagram illustrating a map size estimator of a BS in a broadband wireless communication system according to an exemplary embodiment of the present invention.

FIG. 7 is a block diagram illustrating the map size estimator 606 of FIG. 6.

Referring to FIG. 7, the map size estimator 606 includes a PDU selector 702, a MAP size calculator 704, an available resource calculator 706, a required resource calculator 708, and an estimation value determining unit 710.

The PDU selector 702 sequentially selects PDUs to be used to estimate a MAP message size according to the PDU priorities determined by the priority determining unit 604. In this case, the PDU selector 702 selects a PDU to be used to estimate the MAP message size among the PDUs having an effective-sized capacity. The MAP size calculator 704 determines the type and number of MAP message IEs required to transmit PDUs selected by the PDU selector 702.

The available resource calculator 706 calculates an amount of resources that can be used for burst allocation within a frame, that is, a resource amount of the burst allocation region 106, on the basis of the MAP message size calculated by the MAP size calculator 704. The required resource calculator 708 calculates a resource amount required to transmit the PDUs selected by the PDU selector 702. In this case, the required resource calculator 708 calculates a resource amount required for each region.

The estimation value determining unit 710 determines a final estimation value of the MAP message size by using resource amount information required to transmit the selected PDUs provided from the required resource calculator 708 and by using resource amount information regarding the burst allocation region 106 and provided from the available resource calculator 706. That is, if the required resource amount is less than the resource amount of the burst allocation region 106, the estimation value determining unit 710 instructs the PDU selector 702 to additionally select one PDU. Otherwise, if the required amount is greater than or equal to the resource amount of the burst allocation region 106, the estimation value determining unit 710 determines the MAP message size finally calculated by the MAP size calculator 704 as the final estimation value.

A process of estimating the MAP message size on the basis of the structure of FIG. 7 according to a first embodiment of the present invention will now be described. In the first embodiment, the burst allocation region 106 of FIG. 2A is used.

After the priority determining unit 604 determines the priorities among the PDUs, the PDU selector 702 selects one allocable PDU from a plurality of PDUs according to the priorities. That is, the BS selects a PDU having an nth scheduling priority to estimate the MAP message size, where n is initialized to one (1) when this process starts, and is incremented by one (1) whenever this process is repeated. In this case, the BS selects one PDU from PDUs having an effective capacity. The effective capacity implies a capacity exceeding zero (0) bytes.

After the PDU selector 702 selects one allocable PDU, the required resource calculator 708 calculates the total number of slots to be allocated to a region including the selected PDU, that is, the PDU having the $n^{th}$ scheduling priority, and the total number of slots to be allocated to all regions. For example, if the selected PDU is included in the nonMIMO&nonHARQ region 212, the required resource calculator 708 increments the number of slots to be allocated to the nonMIMO&nonHARQ region 212 and the total number of slots to be allocated to all regions by the number of slots to be occupied by the selected PDU. In other words, the required resource calculator 708 calculates the number of slots to be allocated to the region including the PDU having the $n^{th}$ scheduling priority for transmitting a PDU having a $1^{st}$ scheduling priority through the PDU having the $n^{th}$ scheduling priority, and also calculates the total number of slots to be allocated to all regions. The total number of slots to be allocated to all regions includes the number of slots of a PDU to be fragmented when exceeding the maximum number of slots that can be included in the DL subframe.

The MAP size calculator 704 updates the number of MAP message IEs for a region including the selected PDU. That is, if burst allocation information on the region including the selected PDU is added to the MAP message due to the selected PDU, the MAP size calculator 704 increments the number of corresponding MAP message IEs. For example, when the selected PDU is included in the nonMIMO&nonHARQ region 212, if the same MCS level as that of the selected PDU does not exist in MCS levels of PDUs included in the previously selected nonMIMO&nonHARQ region 212, the MAP size calculator 704 increments the number of MAP IEs by one (1). The MAP IE is a MAP message IE indicating resource allocation information of a burst included in the nonMIMO&nonHARQ region 212. Alternatively, when the selected PDU is included in the nonMIMO&HARQ region 214, if the same receiving MS as that of the selected PDU does not exist in receiving MSs of PDUs included in the nonMIMO&HARQ region 214, the MAP size calculator 704 increments the number of nonMIMO&HARQ sub-burst IEs by one (1). The receiving MS of the PDU is confirmed using B-CID information included in each PDU. The nonMIMO&HARQ sub-burst IE is a MAP message IE indicating resource allocation information of a burst included in the nonMIMO&HARQ region 214. When the selected PDU is included in the nonMIMO&HARQ region 214, if the same MCS level as that of the selected PDU does not exist in MCS levels of PDUs included in the nonMIMO&HARQ region 214, the MAP size calculator 704 increments the number of DIUC changes by one (1). The DIUC change is a MAP message IE indicating an MCS level change among bursts included in the nonMIMO&HARQ region 214. Alternatively, when the selected PDU is included in the MIMO&nonHARQ region 222, if the same receiving MS as that of the selected PDU does not exist in receiving MSs of PDUs included in the MIMO&nonHARQ region 222, the MAP size calculator 704 increments the number of MIMO&nonHARQ sub-burst IEs by one (1). The receiving MS of the PDU is confirmed using B-CID information included in each PDU. The MIMO&nonHARQ sub-burst IE is a MAP message IE indicating resource allocation information of a burst included in the MIMO&nonHARQ region 222. Alternatively, when the selected PDU is included in the MIMO&HARQ region 224, if the same receiving MS as that of the selected PDU does not exist in receiving MSs of PDUs included in the MIMO&HARQ region 224, the MAP size calculator 704 increments the number of MIMO&HARQ sub-burst IEs by one (1). The receiving MS of the PDU is confirmed using B-CID information included in each PDU. The MIMO&HARQ sub-burst IE is a MAP message IE indicating resource allocation information of a burst included in the MIMO&HARQ region 224. After determining the type and number of MAP message IEs, the MAP size calculator 704 calculates the number of MAP subchannels and the number of MAP symbols on the basis of the number of updated MAP message IEs.

The available resource calculator 706 calculates the number of symbols and the maximum number of slots allocable to the DL subframe. The number of MAP subchannels and the number of MAP symbols are determined according to the number of updated MAP message IEs. The number of data symbols and the maximum number of slots allocable to the DL subframe are relatively determined according to the number of MAP subchannels and the number of MAP symbols. For example, if thirty (30) slots are included for every two symbols in a structure of a frame in use, the aforementioned variables are calculated by Equation 1A trough Equation 5D above.

Subsequently, the required resource calculator 708 calculates the total number of slots to be allocated to each zone (i.e., the nonMIMO zone 210 and the MIMO zone 220) for transmitting the PDU having the $1^{st}$ scheduling priority through the PDU having the $n^{th}$ scheduling priority, the total number of slots to be allocated to the burst allocation region 106, and a physical subchannel-axis size of the burst allocation region 106. In other words, the required resource calculator 708 calculates the number of slots to be allocated to each zone, and sums the calculated numbers to calculate the number of slots to be allocated to the burst allocation region 106. Further, the required resource calculator 708 calculates the number of subchannels of the burst allocation region 106 by dividing the number of slots to be allocated to the burst allocation region 106 by the number of symbols of the burst allocation region 106.

Then, the required resource calculator 708 calculates the number of data symbols and the maximum number of allocable slots of a zone not including the selected PDU. That is, to guarantee a QoS of PDU transmission, the required resource calculator 708 preferentially calculates the number of data symbols and the maximum number of allocable slots of the zone not including a PDU having a lowest priority at a current time. For example, when the selected PDU is included in the nonMIMO&nonHARQ region 212, the required resource calculator 708 calculates the number of data symbols and the maximum number of slots of the MIMO zone 220. Thereafter, the required resource calculator 708 calculates the number of data symbols and the maximum number of slots of the zone including the selected PDU. For example, when the selected PDU is included in the nonMIMO&nonHARQ region 212, the required resource calculator 708 calculates the number of data symbols and the maximum number of slots of the nonMIMO zone 210. The number of data symbols of the zone including the selected PDU is relatively determined by the number of data symbols of the zone not including the selected PDU. Next, the required resource calculator 708 calculates a physical subchannel-axis size of each region, that is, the nonMIMO&nonHARQ region 212, the nonMIMO&HARQ region 214, the MIMO&nonHARQ region 222, and the MIMO&HARQ region 224. For example, the physical subchannel-axis size of each region is calculated by Equation 6 above.

Thereafter, the estimation value determining unit 710 determines whether subchannel-axis size of a zone including the selected PDU is less than the maximum number of subchannels per symbol. For example, if the selected PDU is included in the nonMIMO&nonHARQ region 212, the estimation value determining unit 710 determines whether a sum of the physical subchannel-axis size of the nonMIMO&nonHARQ region 212 and the physical subchannel-axis size of the nonMIMO&HARQ region 214 is less than the maximum number of subchannels per symbol. If the subchannel-axis size of the zone including the selected PDU is less than the maximum number of subchannels per symbol, the estimation value determining unit 710 instructs the PDU selector 702 to additionally select one PDU. Accordingly, the MAP size calculator 704, the required resource calculator 708, and the available resource calculator 706 repeat the aforementioned operations. Otherwise, if the subchannel-axis size of the zone including the selected PDU is greater than or equal to the maximum number of subchannels per symbol, the estimation value determining unit 710 determines the MAP message size finally calculated by the MAP size calculator 704 as a final estimation value.

A process of estimating the MAP message size on the basis of the structure of FIG. 7 according to a second embodiment of the present invention will now be described. In the second embodiment, the burst allocation region 106 of FIG. 2B is used.

After the priority determining unit 604 determines the priorities among the PDUs, the PDU selector 702 selects one allocable PDU from a plurality of PDUs according to the priorities. That is, the PDU selector 702 selects a PDU having an $n^{th}$ scheduling priority to estimate the MAP message size, where n is initialized to one (1) when this process starts, and is incremented by one (1) whenever this process is repeated. In this case, the PDU selector 702 selects one PDU from PDUs having an effective capacity. The effective capacity implies a capacity exceeding zero (0) bytes.

After the PDU selector 702 selects one allocable PDU, the required resource calculator 708 calculates the total number of slots to be allocated to a region including the selected PDU, that is, the PDU having the $n^{th}$ scheduling priority, and the total number of slots to be allocated to all regions. For example, if the selected PDU is included in the nonMIMO&boosting region 252, the required resource calculator 708 increments the number of slots to be allocated to the nonMIMO&boosting region 252 and the total number of slots to be allocated to all regions by the number of slots to be occupied by the selected PDU. In other words, the required resource calculator 708 calculates the number of slots to be allocated to the region including the PDU having the $n^{th}$ scheduling priority for transmitting a PDU having a $1^{st}$ scheduling priority through the PDU having the nth scheduling priority, and also calculates the total number of slots to be allocated to all regions. The total number of slots to be allocated to all regions includes the number of slots of a PDU to be fragmented when exceeding the maximum number of slots that can be included in the DL subframe.

In addition, the required resource calculator 708 calculates the number of effective power slots of a region including the selected PDU, that is, the PDU having the $n^{th}$ scheduling priority. The number of effective power slots is obtained by applying an effect caused by signal power to the number of physical slots, and is obtained by multiplying the number of slots required for data transmission by the weight α of Equation 7 above. The weight a varies according to a boosting or deboosting level applied to a corresponding region. For example, when boosting of '3 dB' is applied in the region, the weight α is set to two (2), and when deboosting of '−3 dB' is applied in the region, the weight α is set to zero point five (0.5). That is, the weight α is a normal scale value having a signal power ratio that varies by boosting or deboosting.

Subsequently, the MAP size calculator 704 updates the number of MAP message IEs for the region including the selected PDU. That is, if burst allocation information on the region including the selected PDU is added to the MAP message due to the selected PDU, the MAP size calculator 704 increments the number of corresponding MAP message IEs. For example, when the selected PDU is included in the nonMIMO&boosting region 252, the nonMIMO&normal region 254, or the nonMIMO&deboosting region 256, if the same MCS level as that of the selected PDU does not exist in MCS levels of PDUs included in the previously selected nonMIMO&boosting region 252, the nonMIMO&normal region 254, or the nonMIMO&deboosting region 256, the MAP size calculator 704 increments the number of MAP IEs by 1. In such example, the MAP IE is a MAP message IE indicating resource allocation information of a burst included in the nonMIMO&boosting region 252, the nonMIMO&normal region 254, or the nonMIMO&deboosting region 256. Alternatively, when the selected PDU is included in the nonMIMO&HARQ region 258, if the same receiving MS as that of the selected PDU does not exist in receiving MSs of PDUs included in the nonMIMO&HARQ region 258, the MAP size calculator 704 increments the number of nonMIMO&HARQ sub-burst IEs by one (1). The receiving MS of the PDU is confirmed using B-CID information included in each PDU. In such example, the nonMIMO&HARQ sub-burst IE is a MAP message IE indicating resource allocation information of a burst included in the nonMIMO&HARQ region 258. When the selected PDU is included in the nonMIMO&HARQ region 258, if the same MCS level as that of the selected PDU does not exist in MCS levels of PDUs included in the nonMIMO&HARQ region 258, the MAP size calculator 704 increments the number of DIUC changes by one (1). The DIUC change is a MAP message IE indicating an MCS level change among bursts included in the nonMIMO&HARQ region 258. Alternatively, when the selected PDU is included in the nonMIMO&boosting region 262, the nonMIMO&normal region 264, or the nonMIMO&deboosting region 266, if the same receiving MS as that of the selected PDU does not exist in receiving MSs of PDUs included in the nonMIMO&boosting region 262, the nonMIMO&normal region 264, or the nonMIMO&deboosting region 266, the MAP size calculator 704 increments the number of MIMO&nonHARQ sub-burst IEs by one (1). The receiving MS of the PDU is confirmed using B-CID information included in each PDU. The MIMO&nonHARQ sub-burst IE is a MAP message IE indicating resource allocation information of a burst included in the nonMIMO&boosting region 262, the nonMIMO&normal region 264, or the nonMIMO&deboosting region 266. Alternatively, when the selected PDU is included in the MIMO&HARQ region 268, if the same receiving MS as that of the selected PDU does not exist in receiving MSs of PDUs included in the MIMO&HARQ region 268, the MAP size calculator 704 increments the number of MIMO&HARQ sub-burst IEs by one (1). The receiving MS of the PDU is confirmed using B-CID information included in each PDU. The MIMO&HARQ sub-burst IE is a MAP message IE indicating resource allocation information of a burst included in the MIMO&HARQ region 268. After determining the type and number of the MAP message IEs, the MAP size calculator 704 calculates the number of MAP subchannels and the number of MAP symbols on the basis of the number of updated MAP message IEs.

Further, the available resource calculator 706 calculates the number of data symbols and the maximum number of slots allocable to the DL subframe. The number of data symbols and the maximum number of slots allocable to the DL subframe are relatively determined according to the number of MAP subchannels and the number of MAP symbols. For example, if thirty (30) slots are included for every two symbols in a structure of a frame in use, the number of subchannels to be assigned to the MAP message, the number of symbols to be assigned to the MAP message, the number of symbols allocable to the data, and the maximum number of slots allocable to the all regions are calculated by Equation 8A through Equation 12D above.

Thereafter, the required resource calculator 708 calculates the total number of effective power slots to be allocated to each zone (i.e., the nonMIMO zone 250 and the MIMO zone 260) for transmitting the PDU having the $1^{st}$ scheduling priority through the PDU having the $n^{th}$ scheduling priority, the total number of effective power slots to be allocated to the burst allocation region 106, and an effective power subchannel-axis size of the burst allocation region 106. The number of effective power slots of the burst allocation region 106 is a sum of the number of effective power slots of the nonMIMO zone 250 and the number of effective power slots of the MIMO zone 260. The effective power subchannel-axis size of the burst allocation region 106 is obtained by dividing the number of effective power slots of the burst allocation region 106 by the number of symbols of the burst allocation region 106. Subsequently, the required resource calculator 708 calculates the number of data symbols and the maximum number of allocable slots of the zone not including the selected PDU. That is, to guarantee a QoS of PDU transmission, the required resource calculator 708 preferentially calculates the number of data symbols and the maximum number of allocable slots of a zone not including a PDU having a lowest priority at a current time. For example, if the selected PDU is included in the nonMIMO&boosting region 252, the required resource calculator 708 calculates the number data symbols and the maximum number of allocable slots of the MIMO zone 260.

Thereafter, the required resource calculator 708 calculates the number of data symbols and the maximum number of slots of the zone including the selected PDU. For example, when the selected PDU is included in the nonMIMO&nonHARQ region 212, the required resource calculator 708 calculates the number of data symbols and the maximum number of slots of the nonMIMO zone 250. The number of data symbols of the zone including the selected PDU is relatively determined by the number of data symbols of the zone not including the selected PDU.

Further, the required resource calculator 708 calculates effective power subchannel-axis sizes and physical subchannel-axis sizes of the nonMIMO&boosting region 252, the nonMIMO&normal region 254, the nonMIMO&HARQ region 258, the nonMIMO&deboosting region 256, the MIMO&boosting region 262, the MIMO&normal region 264, the MIMO&deboosting region 266, and the MIMO&HARQ region 268. For example, the physical subchannel-axis size of each region is calculated by Equation 6 above, and the effective power subchannel-axis size of each region is calculated by Equation 13 above.

Thereafter, the estimation value determining unit 710 determines whether physical subchannel-axis size of the zone including the selected PDU is less than the maximum number of subchannels per symbol and also determines whether effective power subchannel-axis size of the zones including the selected PDU is less than the maximum number of subchannels per symbol. If the physical subchannel-axis size of the zone including the selected PDU is less than the maximum number of subchannels per symbol and also if effective power subchannel axis size of the zone including the selected PDU is less than the maximum number of subchannels per symbol, the estimation value determining unit 710 instructs the PDU selector 702 to additionally select one PDU. Accordingly, the MAP size calculator 704, the required resource calculator 708, and the available resource calculator 706 repeat the aforementioned operations. Otherwise, if the physical subchannel-axis size of zone including the selected PDU is greater than or equal to the maximum number of subchannels per symbol and also if the effective power subchannel-axis size of the zone including the selected PDU is greater than or equal to the maximum number of subchannels per symbol, the estimation value determining unit 710 determines the MAP message size finally calculated by the MAP size calculator 704 as a final estimation value.

According to exemplary embodiments of the present invention, when a broadband wireless communication system uses a DL subframe by divining it into a plurality of regions according to a burst characteristic, a throughput can be improved without waste of resources by estimating a resource amount occupied by a MAP message in the DL subframe.

Further, when a nonMIMO&nonHARQ data burst, a nonMIMO&HARQ data burst, a MIMO&nonHARQ data burst, and a MIMO&HARQ data burst are simultaneously allocated to one frame, a size of a MAP message to be assigned to one frame and the number of data bursts are predicted by estimation, thereby improving a throughput without waste of resources.

Furthermore, when a DL resource is allocated to a specific MS, sizes of a DL MAP IE (i.e., allocation information), a DL HARQ sub-burst IE, a DL MIMO non-HARQ sub-burst IE, and a DL MIMO HARQ sub-burst IE are estimated, and resources are allocated by determining a presence or absence of available slots for the DL MAP IE, the DL HARQ sub-burst IE, the DL MIMO non-HARQ sub-burst IE, and the DL MIMO HARQ sub-burst IE. That is, by predicting whether the DL MAP IE, the DL HARQ sub-burst IE, the DL MIMO non-HARQ sub-burst IE, and the DL MIMO HARQ sub-burst IE are allocable, an amount of resources to be allocated to the MAP message can be predicted according to the number of data bursts to be allocated in comparison with a method of pre-assigning a fixed-sized MAP message. Accordingly, waste of resources occurring when the MAP message size is greater than a MAP message size required for a data burst can be avoided. In addition, waste of resources occurring when the number of allocable bursts is limited due to a limitation in the MAP message size can be avoided.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A resource allocation method of a Base Station (BS) in a wireless communication system, the method comprising:
    determining a maximum resource amount for data allocation based on a resource amount required to transmit a MAP message, wherein the MAP message includes resource allocation information of at least one Packet Data Unit (PDU);
    estimating a size of the MAP message by comparing the maximum resource amount for data allocation and a resource amount required to transmit the at least one PDU;
    evaluating a size of an available burst allocation region according to the estimated size of the MAP message; and
    allocating bursts in the evaluated-sized burst allocation region.

2. The method of claim 1, wherein estimating the size of the MAP message comprises:
    determining priorities among PDUs to be transmitted;
    calculating a resource amount required to transmit the MAP message including resource allocation information of a PDU having a $1^{st}$ scheduling priority through a PDU having an $n^{th}$ scheduling priority;
    calculating the resource amount required to transmit the PDU having the $1^{st}$ scheduling priority through the PDU having the $n^{th}$ scheduling priority;
    determining whether the resource amount required to transmit the PDU having the $1^{st}$ scheduling priority through the PDU having the $n^{th}$ scheduling priority is less than the maximum resource amount for data allocation; and
    if the resource amount required to transmit the PDU having the $1^{st}$ scheduling priority through the PDU having the $n^{th}$ scheduling priority is greater than or equal to the maximum resource amount for data allocation, determining the resource amount required to transmit the MAP message including resource allocation information of the PDU having the $1^{st}$ scheduling priority through the PDU having the $n^{th}$ scheduling priority as a final estimation value.

3. The method of claim 2, wherein estimating the size of the MAP message comprises:
    if the resource amount required to transmit the PDU having the $1^{st}$ scheduling priority through the PDU having the $n^{th}$ scheduling priority is less than the maximum resource amount for data allocation, calculating a resource amount required to transmit a MAP message including resource allocation information of the PDU having the $1^{st}$ scheduling priority through a PDU having an $(n+1)^{th}$ scheduling priority;

calculating the maximum resource amount for data allocation on the basis of the resource amount required to transmit the MAP message;

calculating a resource amount required to transmit the PDU having the $1^{st}$ scheduling priority through the PDU having the $(n+1)^{th}$ scheduling priority; and determining whether the resource amount required to transmit the PDU having the $1^{st}$ scheduling priority through the PDU having the $(n+1)^{th}$ scheduling priority is less than the maximum resource amount required for data allocation.

4. The method of claim 3, wherein calculating the resource amount required to transmit the MAP message including the resource allocation information of the PDU having the $1^{st}$ scheduling priority through the PDU having the $n^{th}$ scheduling priority comprises:

updating the number of MAP message Information Elements (IEs) which is increased by transmitting the PDU having the $n^{th}$ scheduling priority; and calculating the number of symbols and the number of subchannels of the MAP message by using information on the number of MAP message IEs.

5. The method of claim 4, wherein updating the number of MAP message IEs comprises:

determining a region including the PDU having the $n^{th}$ scheduling priority; and if the same Modulation and Coding Scheme (MCS) level as that of the PDU having the $n^{th}$ scheduling priority does not exist in MCS levels of at least one PDU included in the region determined among the PDU having the $1^{st}$ scheduling priority through the PDU having the $(n-1)^{th}$ scheduling priority, incrementing the number of MAP message IEs for the determined region by 1.

6. The method of claim 4, wherein updating the number of MAP message IEs comprises:

determining a region including the PDU having the $n^{th}$ scheduling priority; and if the same receiving Mobile Station (MS) as that of the PDU having the $n^{th}$ scheduling priority does not exist in receiving MSs of at least one PDU included in the region determined among the PDU having the $1^{st}$ scheduling priority through the PDU having the $(n-1)^{th}$ scheduling priority, incrementing the number of MAP message IEs for the determined region by 1.

7. The method of claim 3, wherein calculating the resource amount required to transmit the PDU having the $1^{st}$ scheduling priority through the PDU having the $n^{th}$ scheduling priority comprises:

calculating a total number of slots to be allocated to a region including the PDU having the $n^{th}$ scheduling priority and a total number of slots to be allocated to all regions to transmit the PDU having the $1^{st}$ scheduling priority through the PDU having the $n^{th}$ scheduling priority;

calculating a total number of slots to be allocated to each zone, a total number of slots to be allocated to the burst allocation region, and a subchannel-axis size of the burst allocation region;

calculating a number of data symbols and a maximum number of allocable slots of a zone not including the PDU having the $n^{th}$ scheduling priority;

calculating the number of data symbols and the maximum number of allocable slots of a zone including the PDU having the $n^{th}$ scheduling priority; and calculating a subchannel-axis size of each region for transmitting the PDU having the $1^{st}$ scheduling priority through the PDU having the $n^{th}$ scheduling priority.

8. The method of claim 7, wherein determining whether the resource amount required to transmit the PDU having the $1^{st}$ scheduling priority through the PDU having the $n^{th}$ scheduling priority is less than the maximum resource amount for data allocation comprises:

calculating a sum of subchannel-axis sizes of regions belonging to the zone including the PDU having the $n^{th}$ scheduling priority; and determining whether the sum of the subchannel-axis sizes is less than the maximum number of subchannels per symbol.

9. The method of claim 3, wherein calculating the resource amount required to transmit the PDU having the $1^{st}$ scheduling priority through the PDU having the $n^{th}$ scheduling priority comprises:

calculating the total number of slots to be allocated to a region including the PDU having the $n^{th}$ scheduling priority and the total number of slots to be allocated to all regions to transmit the PDU having the $1^{st}$ scheduling priority through the PDU having the $n^{th}$ scheduling priority;

calculating the number of effective power slots of a region including the PDU having the $n^{th}$ scheduling priority by multiplying the number of slots to be allocated to the region including the PDU having the $n^{th}$ scheduling priority and a weight corresponding to a power boosting magnitude applied to the region including the PDU having the $n^{th}$ scheduling priority;

calculating a number of effective power slots of each zone, the number of effective power slots of the burst allocation region, and an effective power subchannel-axis size of the burst allocation region;

calculating the number of data symbols and the maximum number of allocable slots of the zone not including the PDU having the $n^{th}$ scheduling priority;

calculating the number of data symbols and the maximum number of allocable slots of the zone including the PDU having the $n^{th}$ scheduling priority;

calculating the effective power subchannel-axis of each region for transmitting the PDU having the $1^{st}$ scheduling priority through the PDU having the $n^{th}$ scheduling priority; and calculating the number of physical subchannels of each region for transmitting the PDU having the $1^{st}$ scheduling priority through the PDU having the $n^{th}$ scheduling priority.

10. The method of claim 9, wherein determining whether the resource amount required to transmit the PDU having the $1^{st}$ scheduling priority through the PDU having the $n^{th}$ scheduling priority is less than the maximum resource amount for data allocation comprises:

calculating a sum of physical subchannel-axis sizes and a sum of effective power subchannel-axis sizes of regions belonging to the zone including the PDU having the $n^{th}$ scheduling priority; and determining whether the sum of effective power subchannel-axis sizes is less than the maximum number of subchannels and also whether the sum of the subchannel-axis sizes is less than the maximum number of subchannels per symbol.

11. The method of claim 1, wherein determining the priorities among Packet Data Units (PDUs) to be transmitted comprises classifying the PDUs according to a burst region.

12. A Base Station (BS) apparatus in a wireless communication system, the apparatus comprising:
processing circuitry configured to:
determine a maximum resource amount for data allocation based on a resource amount required to transmit a MAP message, the MAP message including resource allocation information of at least one Packet Data Unit (PDU);
estimate a size of the MAP message by comparing the maximum resource amount for data allocation and a resource amount required to transmit the at least one PDU; and
evaluate a size of an available burst allocation region according to the estimated size of the MAP message and to allocate bursts in the evaluated-sized burst allocation region.

13. The apparatus of claim 12, wherein the processing circuitry is further configured to:
calculate the resource amount required to transmit the MAP message including resource allocation information of a PDU having a $1^{st}$ scheduling priority through a PDU having an $n^{th}$ scheduling priority;
calculate the resource amount required to transmit the PDU having the $1^{st}$ scheduling priority through the PDU having the $n^{th}$ scheduling priority; and
determine the resource amount required to transmit the MAP message including resource information of the PDU having the $1^{st}$ scheduling priority through the PDU having the $n^{th}$ scheduling priority as a final estimation value if the resource amount required to transmit the PDU having the $1^{st}$ scheduling priority through the PDU having the $n^{th}$ scheduling priority is greater than or equal to the maximum resource amount for data allocation as a result of determining whether the resource amount required to transmit the PDU having the $1^{st}$ scheduling priority through the PDU having the $n^{th}$ scheduling priority is less than the maximum resource amount for data allocation.

14. The apparatus of claim 13,
wherein, if the resource amount required to transmit the PDU having the $1^{st}$ scheduling priority through the PDU having the $n^{th}$ scheduling priority is less than the maximum resource amount for data allocation, the processing circuitry:
calculates a resource amount required to transmit a MAP message including resource allocation information of the PDU having the $1^{st}$ scheduling priority through a PDU having an $(n+1)^{th}$ scheduling priority;
calculates the maximum resource amount for data allocation on the basis of the resource amount required to transmit the MAP message;
calculates a resource amount required to transmit the PDU having the $1^{st}$ scheduling priority through the PDU having the $(n+1)^{th}$ scheduling priority; and
determines whether the resource amount required to transmit the PDU having the $1^{st}$ scheduling priority through the PDU having the $(n+1)^{th}$ scheduling priority is less than the maximum resource amount required for data allocation.

15. The apparatus of claim 14, wherein the processing circuitry updates the number of MAP message Information Elements (IEs), which is increased by transmitting the PDU having the $n^{th}$ scheduling priority, and calculates the number of symbols and the number of subchannels of the MAP message by using information on the number of MAP message IEs.

16. The apparatus of claim 15, wherein the processing circuitry determines a region including the PDU having the $n^{th}$ scheduling priority, and, if the same Modulation and Coding Scheme (MCS) level as that of the PDU having the nth scheduling priority does not exist in MCS levels of at least one PDU included in the region determined among the PDU having the $1^{st}$ scheduling priority through the PDU having the $(n-1)^{th}$ scheduling priority, increments the number of MAP message IEs for the determined region by 1.

17. The apparatus of claim 15, wherein the processing circuitry determines a region including the PDU having the $n^{th}$ scheduling priority, and, if the same receiving Mobile Station (MS) as that of the PDU having the $n^{th}$ scheduling priority does not exist in receiving MSs of at least one PDU included in the region determined among the PDU having the $1^{st}$ scheduling priority through the PDU having the $(n-1)^{th}$ scheduling priority, increments the number of MAP message IEs for the determined region by 1.

18. The apparatus of claim 14, wherein the processing circuitry calculates the total number of slots to be allocated to a region including the PDU having the $n^{th}$ scheduling priority and the total number of slots to be allocated to all regions to transmit the PDU having the $1^{st}$ scheduling priority through the PDU having the $n^{th}$ scheduling priority, calculates the total number of slots to be allocated to each zone, the total number of slots to be allocated to the burst allocation region, and a subchannel-axis size of the burst allocation region, calculates the number of data symbols and the maximum number of allocable slots of a zone not including the PDU having the $n^{th}$ scheduling priority, calculates the number of data symbols and the maximum number of allocable slots of a zone including the PDU having the $n^{th}$ scheduling priority, and calculates a subchannel-axis size of each region for transmitting the PDU having the $1^{st}$ scheduling priority through the PDU having the $n^{th}$ scheduling priority.

19. The apparatus of claim 18, wherein the processing circuitry determines whether a sum of subchannel-axis sizes of regions belonging to the zone including the PDU having the $n^{th}$ scheduling priority is less than the maximum number of subchannels per symbol.

20. The apparatus of claim 14, wherein the processing circuitry calculates the total number of slots to be allocated to a region including the PDU having the nth scheduling priority and the total number of slots to be allocated to all regions to transmit the PDU having the $1^{st}$ scheduling priority through the PDU having the $n^{th}$ scheduling priority, calculates the number of effective power slots of a region including the PDU having the $n^{th}$ scheduling priority by multiplying the number of slots to be allocated to the region including the PDU having the nth scheduling priority and a weight corresponding to a power boosting magnitude applied to the region including the PDU having the $n^{th}$ scheduling priority, calculates the number of effective power slots of each zone, the number of effective power slots of the burst allocation region, and an effective power subchannel-axis size of the burst allocation region, calculates the number of data symbols and the maximum number of allocable slots of the zone not including the PDU having the $n^{th}$ scheduling priority, calculates the number of data symbols and the maximum number of allocable slots of the zone including the PDU having the $n^{th}$ scheduling priority, calculates the effective power subchannel-axis of each region for transmitting the PDU having the $1^{st}$ scheduling priority through the PDU having the $n^{th}$ scheduling priority, and calculates the number of physical subchannels of each region for transmitting the PDU having the $1^{st}$ scheduling priority through the PDU having the $n^{th}$ scheduling priority.

21. The apparatus of claim 20, wherein the processing circuitry:
   calculates a sum of physical subchannel-axis sizes and a sum of effective power subchannel-axis sizes of regions belonging to the zone including the PDU having the $n^{th}$ scheduling priority;
   determines whether the sum of effective power subchannel-axis sizes is less than the maximum number of subchannels; and
   determines whether the sum of the subchannel-axis sizes is less than the maximum number of subchannels per symbol.

22. The apparatus of claim 12, wherein the processing circuitry is further configured to determine priorities among PDUs to be transmitted.

* * * * *